United States Patent
Locke et al.

(10) Patent No.: US 10,752,040 B2
(45) Date of Patent: Aug. 25, 2020

(54) METHOD OF FORMING A SECURITY DEVICE

(71) Applicant: DE LA RUE INTERNATIONAL LIMITED, Basingstoke, Hampshire (GB)

(72) Inventors: Rebecca Locke, Kingsclere (GB); John Godfrey, London (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 16/482,918

(22) PCT Filed: Jan. 31, 2018

(86) PCT No.: PCT/GB2018/050280
§ 371 (c)(1),
(2) Date: Aug. 1, 2019

(87) PCT Pub. No.: WO2018/142128
PCT Pub. Date: Aug. 9, 2018

(65) Prior Publication Data
US 2019/0358989 A1    Nov. 28, 2019

(30) Foreign Application Priority Data
Feb. 3, 2017 (GB) .................................. 1701796.3

(51) Int. Cl.
*B42D 25/324* (2014.01)
*B42D 25/328* (2014.01)
(Continued)

(52) U.S. Cl.
CPC ......... *B42D 25/324* (2014.10); *B42D 25/328* (2014.10); *B42D 25/364* (2014.10);
(Continued)

(58) Field of Classification Search
CPC .. B42D 25/324; B42D 25/328; B42D 25/364; B42D 25/378; B42D 25/425;
(Continued)

(56) References Cited

U.S. PATENT DOCUMENTS

| 4,434,010 A | 2/1984 | Ash |
| 5,059,245 A | 10/1991 | Phillips et al. |

(Continued)

FOREIGN PATENT DOCUMENTS

| AU | 2015100575 A4 | 5/2015 |
| EP | 0 059 056 A1 | 9/1982 |

(Continued)

OTHER PUBLICATIONS

Jul. 27, 2017 Search Report issued in British Patent Application No. GB1701798.9.

(Continued)

*Primary Examiner* — Justin V Lewis
(74) *Attorney, Agent, or Firm* — Oliff PLC

(57) ABSTRACT

A method of forming a security device includes a colour shifting element, wherein the colour shifting element provides a first optical effect, the method includes; providing a light control layer over at least a part of the colour shifting element, the light control layer including a functional region and at least one non-functional region, wherein the functional region includes a surface relief adapted to modify the angle of light from the colour shifting element so as to generate a second optical effect different from the first optical effect, and wherein the non-functional region does not substantially modify the angle of light from the colour shifting element, and; wherein the at least one non-functional region is not discernible to the naked eye.

19 Claims, 13 Drawing Sheets

(51) Int. Cl.
*B42D 25/364* (2014.01)
*B42D 25/378* (2014.01)
*B42D 25/425* (2014.01)
*B42D 25/435* (2014.01)
*G02B 5/04* (2006.01)
*B42D 25/23* (2014.01)
*B42D 25/24* (2014.01)
*B42D 25/29* (2014.01)
*B42D 25/351* (2014.01)
*B42D 25/355* (2014.01)
*B42D 25/41* (2014.01)
*B42D 25/44* (2014.01)

(52) U.S. Cl.
CPC ......... *B42D 25/378* (2014.10); *B42D 25/425* (2014.10); *B42D 25/435* (2014.10); *G02B 5/045* (2013.01); *B42D 25/23* (2014.10); *B42D 25/24* (2014.10); *B42D 25/29* (2014.10); *B42D 25/351* (2014.10); *B42D 25/355* (2014.10); *B42D 25/41* (2014.10); *B42D 25/44* (2014.10)

(58) Field of Classification Search
CPC ........ B42D 25/23; B42D 25/24; B42D 25/29; B42D 25/351; B42D 25/355; B42D 25/41; B42D 25/44; B42D 25/373; B42D 25/36; G02B 5/045; B41M 3/14
USPC ................... 283/67, 70, 72, 74, 94, 98, 901
See application file for complete search history.

(56) References Cited

U.S. PATENT DOCUMENTS

| | | | |
|---|---|---|---|
| 5,084,351 A | 1/1992 | Philips et al. | |
| 5,135,812 A | 8/1992 | Phillips et al. | |
| 5,171,363 A | 12/1992 | Phillips et al. | |
| 5,571,624 A | 11/1996 | Phillips et al. | |
| 8,124,217 B2 | 2/2012 | Phillips et al. | |
| 9,964,674 B2 | 5/2018 | Patel et al. | |
| 2004/0169791 A1 | 9/2004 | Nilsen et al. | |
| 2008/0018965 A1 | 1/2008 | Phillips et al. | |
| 2008/0278816 A1 | 11/2008 | Phillips et al. | |
| 2010/0196587 A1 | 8/2010 | Keller | |
| 2010/0254015 A1 | 10/2010 | Booyens et al. | |
| 2010/0270379 A1* | 10/2010 | Lister .................... | B42D 25/00 235/487 |
| 2011/0095518 A1 | 4/2011 | Hoffmuller et al. | |
| 2012/0193905 A1 | 8/2012 | Schilling et al. | |
| 2014/0103632 A1 | 4/2014 | Camus et al. | |
| 2015/0352887 A1 | 12/2015 | Holmes | |
| 2016/0257019 A1 | 9/2016 | Baist | |

FOREIGN PATENT DOCUMENTS

| | | |
|---|---|---|
| EP | 0 341 002 A2 | 11/1989 |
| EP | 0 668 329 A2 | 8/1995 |
| EP | 0 741 170 A1 | 11/1996 |
| EP | 0 860 298 A2 | 8/1998 |
| EP | 1 398 174 A1 | 3/2004 |
| EP | 2 161 598 A2 | 3/2010 |
| JP | 2011-173379 A | 9/2011 |
| WO | 83/00659 A1 | 3/1983 |
| WO | 95/10419 A1 | 4/1995 |
| WO | 95/10420 A1 | 4/1995 |
| WO | 95/17475 A1 | 6/1995 |
| WO | 00/12634 A1 | 3/2000 |
| WO | 00/29391 A1 | 7/2000 |
| WO | 03/054297 A2 | 7/2003 |
| WO | 03/095188 A2 | 11/2003 |
| WO | 2004/030928 A1 | 4/2004 |
| WO | 2009/056354 A1 | 5/2009 |
| WO | 2009/056359 A2 | 5/2009 |
| WO | 2009/066048 A1 | 5/2009 |
| WO | 2013/017865 A1 | 2/2013 |
| WO | 2013/022699 A1 | 2/2013 |
| WO | 2013/064268 A1 | 5/2013 |
| WO | 2017/009619 A1 | 1/2017 |

OTHER PUBLICATIONS

Jun. 15, 2018 Search Report issued in International Patent Application No. PCT/GB2018/050281.
Jul. 27, 2017 Search Report issued in British Patent Application No. GB1701796.3.
Apr. 24, 2018 Search Report issued in International Patent Application No. PCT/GB2018/050280.
Jul. 27, 2017 Search Report issued in British Patent Application No. GB1701795.5.
May 9, 2018 Search Report issued in International Patent Application No. PCT/GB2018/050279.
U.S. Appl. No. 16/482,936, filed Aug. 1, 2019 in the name of Godfrey et al.
U.S. Appl. No. 16/482,890, filed Aug. 1, 2019 in the name of Godfrey et al.
Jun. 15, 2018 Written Opinion of the International Searching Authority issued in International Patent Application No. PCT/GB2018/050281.
Apr. 24, 2018 Written Opinion of the International Searching Authority issued in International Patent Application No. PCT/GB2018/050280.
May 9, 2018 Written Opinion of the International Searching Authority issued in International Patent Application No. PCT/GB2018/050279.
Jul. 27, 2019 Search Report issued in British Patent Application No. GB1701795.5.
Feb. 26, 2020 Office Action issued in U.S. Appl. No. 16/482,936.
Jan. 9, 2020 Office Action issued in U.S. Appl. No. 16/482,890.
May 6, 2020 Office Action issued in British Patent Application No. 1701795.5.

* cited by examiner

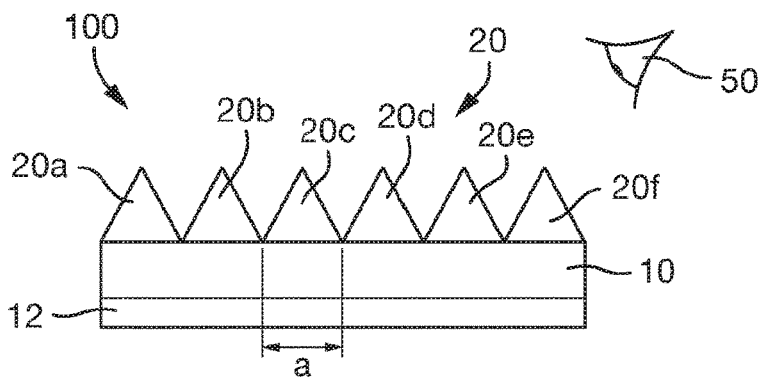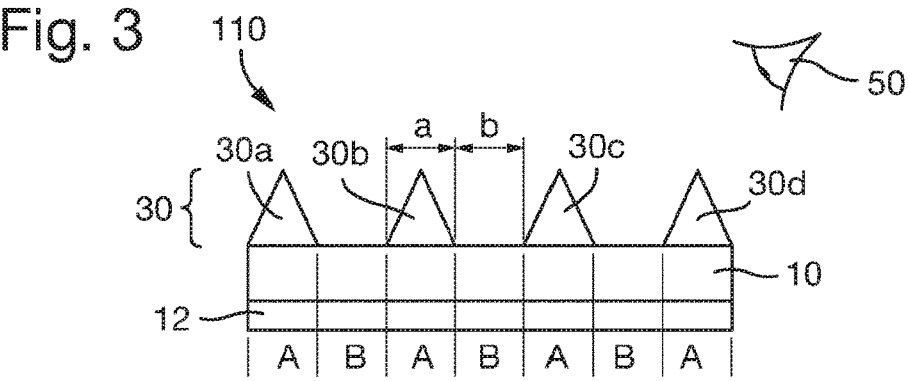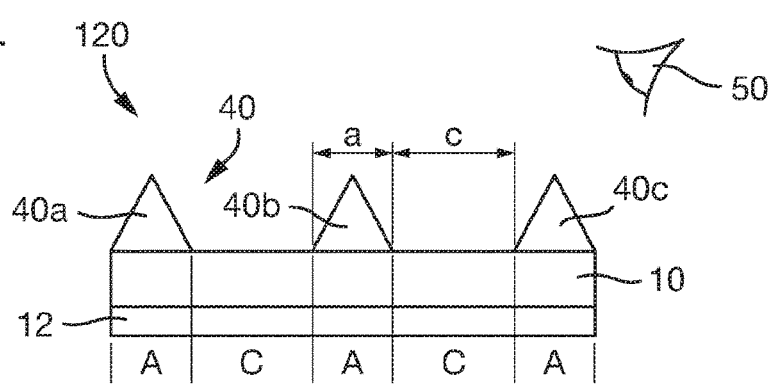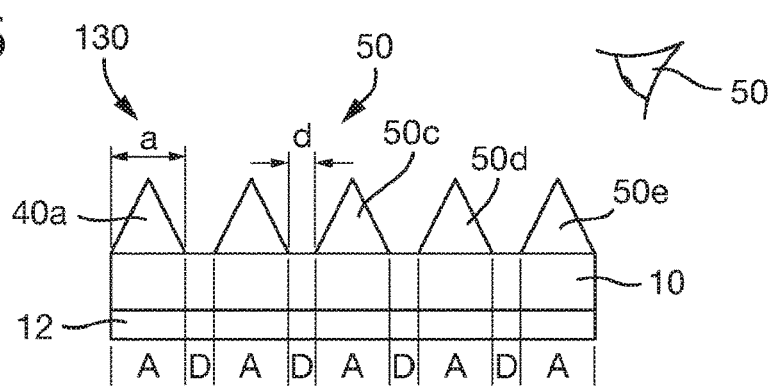

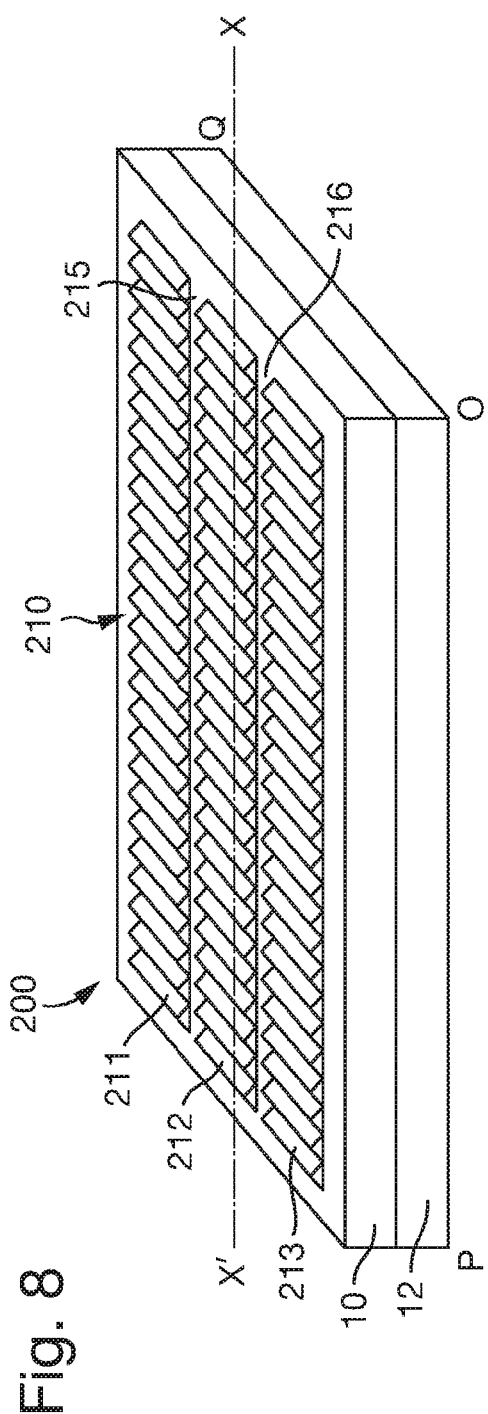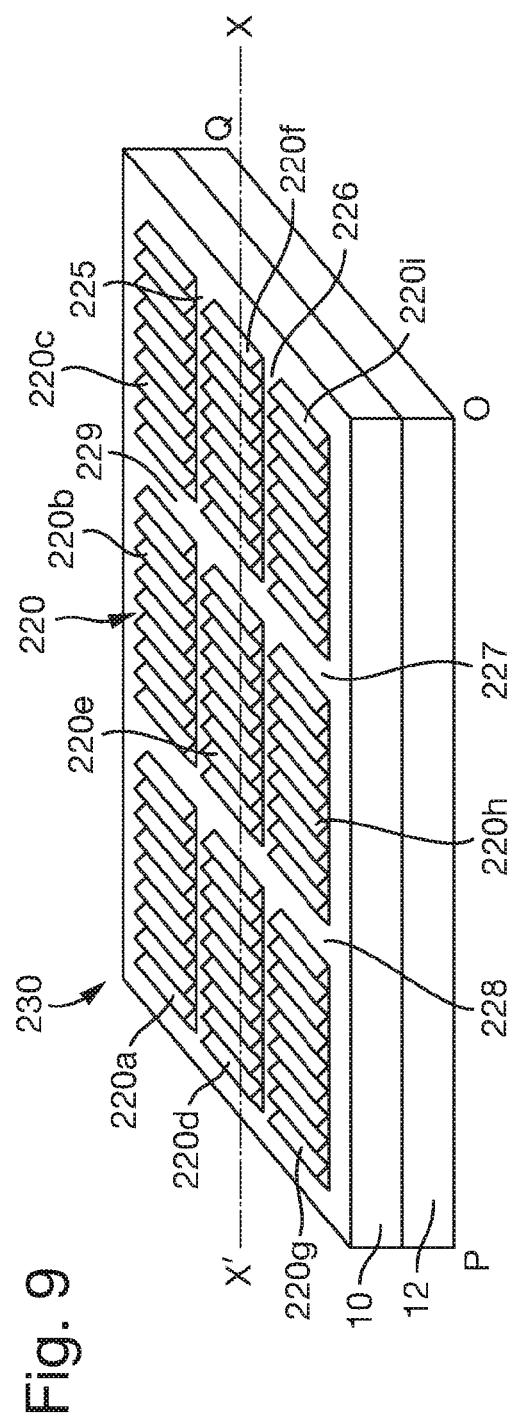

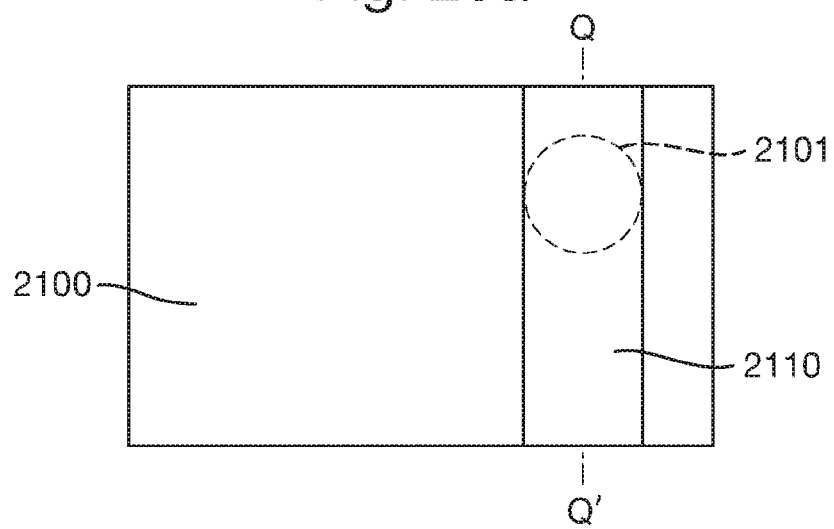
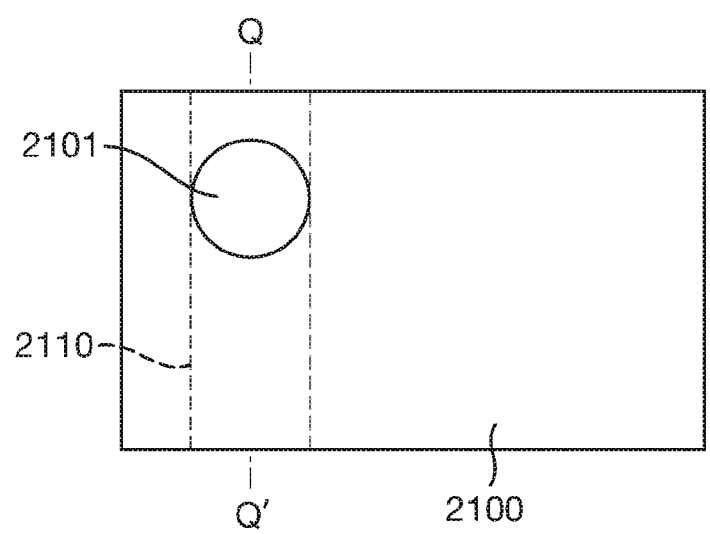 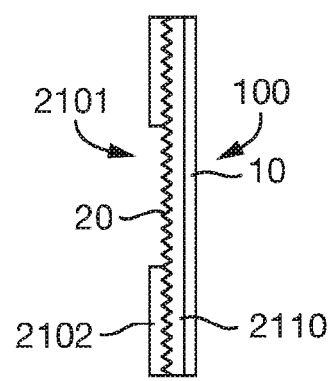

METHOD OF FORMING A SECURITY DEVICE

FIELD OF THE INVENTION

The present invention relates to security devices suitable for use in security documents such as banknotes, identity documents, passports, certificates and the like, as well as methods for manufacturing such security devices.

BACKGROUND TO THE INVENTION

To prevent counterfeiting and to enable authenticity to be checked, security documents are typically provided with one or more security devices which are difficult or impossible to replicate accurately with commonly available means such as photocopiers, scanners or commercial printers.

One well known type of security device is one which uses a colour shifting element to produce an optically variable effect that is difficult to counterfeit. Such a colour shifting element generates a coloured appearance which changes dependent on the viewing angle. Examples of known colour shifting structures include photonic crystals, liquid crystals, interference pigments, pearlescent pigments, structured interference materials or thin film interference structures including Bragg stacks.

It is also known in the art that the optical effect produced by a colour shifting element can be modified by introducing a film comprising a surface relief over the colour shifting element, wherein the surface relief comprises a plurality of angled facets that refract the light incident to, and reflected from, the colour shifting element so as to provide a different optical effect to the viewer. For example, such an additional "light control" layer may produce colour shifting effects which are visible closer to a normal angle of viewing with respect to the device, and may enable more colours to be viewed on tilting the device as compared to the colour shifting element in isolation.

In order to increase the difficulty of counterfeiting such a security device, it is beneficial for the security device to exhibit more than one colour shifting effect. The amount of refraction of light (and therefore the exhibited colour shifting effect) is dependent at least upon the facet angles of the surface relief, and the use of different facet angles allows for different amounts of refraction and, correspondingly, different colour shifting effects. However, although this is beneficial for security, it is difficult to produce a surface relief having a plurality of different facet angles.

SUMMARY OF THE INVENTION

In accordance with a first aspect of the present invention there is provided a method of forming a security device comprising a colour shifting element, wherein the colour shifting element provides a first optical effect, the method comprising; providing a light control layer over at least a part of the colour shifting element, the light control layer comprising a functional region and at least one non-functional region, wherein the functional region comprises a surface relief adapted to modify the angle of light from the colour shifting element so as to generate a second optical effect different from the first optical effect, and wherein the non-functional region does not substantially modify the angle of light from the colour shifting element, and; wherein the at least one non-functional region is not discernible to the naked eye.

The present invention overcomes the problems outlined in the background to the invention section above by providing at least one non-functional region as part of a light control layer provided over at least a part of a colour shifting element. The at least one non-functional region does not substantially modify the angle of light from the colour shifting element, meaning that the optical effect exhibited by the at least one non-functional region is substantially the same as that provided by the colour shifting element in isolation (i.e. the first optical effect). As the at least one non-functional region is not discernible to the naked eye, at least at one part of the security device, the first and second optical effects (generated by the non-functional and functional regions respectively) combine to form a third optical effect, rather than a viewer of the security device seeing two distinct optical effects.

The expression "colour shifting element" is used to refer to any material which can selectively reflect or transmit incident light to create an optically variable effect, in particular an angularly dependent coloured reflection or transmission. Examples of such a colour shifting element include photonic crystals, liquid crystals, interference pigments, pearlescent pigments, structured interference materials or thin film interference structures including Bragg stacks. A particularly suitable material for the colour shifting element is a liquid crystal film.

In general the colour shifting element may be substantially opaque or partially transparent. A partially transparent colour shifting element (for example a liquid crystal film) transmits at least some of the light that is incident upon it as well as providing an optical effect in reflection. An example of a substantially opaque colour shifting element is an optically variable pigment. Optically variable pigments having a colour shift between two distinct colours, with the colour shift being dependent on the viewing angle, are well known. The production of these pigments, their use and their characteristic features are described in, inter-alia, U.S. Pat. Nos. 4,434,010, 5,059,245, 5,084,351, 5,135,812, 5,171,363, 5,571,624, EP-A-0341002, EP-A-0736073, EP-A-668329, EP-A-0741170 and EP-A-1114102. Optically variable pigments having a viewing angle-dependent shift of colour are based on a stack of superposed thin-film layers with different optical characteristics. The hue, the amount of colour-shifting and the chromaticity of such thin-film structures depend inter alia on the material constituting the layers, the sequence and the number of layers, the layer thickness, as well as on the production process. Generally, optically variable pigments comprise an opaque totally reflecting layer, a dielectric layer of a low refractive index material (i.e. with an index of refraction of 1.65 or less) deposited on top of the opaque layer and a semi-transparent partially reflecting layer applied on the dielectric layer.

The security device may be viewed in reflection or transmission. If the device is intended to be viewed in reflection and comprises a partially transparent colour shifting element such as a liquid crystal film, it is preferable that the security device further comprises an absorbing element positioned on a distal side of the colour shifting element with respect to the light control layer (i.e. such that the colour shifting element is positioned between the light-absorbing material and the viewer) and operable to at least partially absorb light transmitted through the colour shifting element. Such a light-absorbing element positioned under the colour shifting element substantially absorbs light that is transmitted through the colour shifting element and light reflected from the colour shifting element dominates. In the case where a substantially opaque colour shifting element is used, such an absorbing element is not required.

The surface relief of the functional region typically comprises a plurality of facets angled with respect to the colour shifting element, defining a plurality of elevations and depressions. The fact that the functional region comprises a surface relief means that the interface between the functional region of the light control layer and the air is angled with respect to the colour shifting element, thereby modifying the angle of light from the colour shifting element by refraction. This gives rise to the second optical effect that is different to the first optical effect that would be exhibited by the colour shifting element in isolation. As an example, a liquid crystal colour shifting element in isolation may provide a red to green colour shift effect when tilted, and this corresponds to the first optical effect. However, when a surface relief is provided over such a light control element, a red to blue colour shift effect is exhibited to the user (with a green colour seen at an intermediate tilt angle), as blue light from the colour shifting element is no longer totally internally reflected (see FIG. 1b). It is this red to blue colour shift in this example that is the "second optical effect". Although red to green and red to blue colour shifts have been used as examples here, the exact optical effects will be dependent upon at least the colour shifting material used, the refractive index of the light control layer and the angles that the facets of the microprismatic structure make with the colour shifting layer. For example a colour shifting element that exhibits a black (infra-red) to red colour shift upon a change of viewing angle may be used.

Here "tilting" is used to mean a change in viewing angle of the security device by tilting the device about an axis in the plane of the device. Typically the change in viewing angle is from a normal angle of viewing to a non-normal angle of viewing.

The use of functional and non-functional regions of the light control layer enables much easier and more efficient control of the modification of light from the colour shifting element as compared to changing the facet angles of a light control layer. For example, the facet angles of the surface relief of the functional region may be all substantially identical (and therefore easier to form), and the combined optical effect(s) exhibited to a viewer are be controlled by the arrangement and dimensions of the non-functional regions.

Typically, at least at one viewing angle, the first optical effect exhibits a first colour and the second optical effect exhibits a second colour different from the first colour, and the third optical effect exhibits a resultant colour comprising the first and second colours. Therefore a single security device may exhibit an array of different colours simply by providing a light control layer comprising functional and non-functional regions. The colours exhibited by the functional and non-functional regions "mix" together in order to exhibit the resultant colour to a viewer. The resultant colour exhibited to a viewer is dependent on the ratio of the functional and non-functional regions of the light control layer.

The at least one non-functional region is not discernible to the naked eye. Here this means that the dimensions of the at least one non-functional region are such that the non-functional region cannot be resolved (i.e. "seen") by the naked eye. Here the term "naked" means "unaided" (i.e. without the aid of a magnifying apparatus). It is generally accepted that the naked human eye cannot perceive dimensions smaller than approximately 150 µm. Therefore, the at least one non-functional region has a dimension less than 150 µm, preferably less than 100 µm, and more preferably less than 70 µm.

Typically, as described above, at least at one viewing angle, the first optical effect exhibits a first colour and the second optical effect exhibits a second colour different from the first colour. The at least one non-functional region not being discernible to the naked eye means that the viewer perceives a combination (i.e. "mixing") of the first and second colours in the form of a resultant colour, rather than two distinct regions of different colour, as would be the case if the non-functional region was discernible to the naked eye.

The at least one non-functional region may comprise a region where no light control layer material is present. In other words, the at least one non-functional region may comprise a "gap" in the light control layer such that light from the colour shifting element does not pass through the material (typically a polymer) forming the light control layer. In this scenario, the non-functional region is still considered a part of the overall structure of the light control layer.

The at least one non-functional region may comprise a planar region, typically a planar layer of light control layer material (e.g. polymer). Such a planar region typically comprises a planar surface substantially parallel to the colour shifting element, such that light from the colour shifting element is not refracted substantially differently to how it would be if the colour shifting element was provided in isolation. In this manner, the optical effect exhibited by such a planar non-functional region is substantially the first optical effect generated by the colour shifting element.

Typically, the light control layer comprises a plurality of functional regions spaced apart by non-functional regions. The functional regions may be spaced apart in a periodic or a non-periodic manner, with the different spacings of the functional regions giving rise to different combined optical effects exhibited to a viewer. Different areas of the light control layer may comprise different arrangements and spacings of the functional and non-functional regions. For example the light control layer may comprise first and second areas, wherein the first area comprises a first arrangement of functional regions and the second area comprises a second arrangement of functional regions such that the first and second areas provide different optical effects to a viewer. In practice, this allows a security device to be provided which exhibits areas of different colour to a viewer upon tilting. Moreover, such areas may define pixels of a complex colour image exhibited by the security device. In such a case, the areas defining the pixels would typically each not be discernible to the naked eye. For example, each pixel may have dimensions less than 150 µm and comprise non-functional regions having dimensions of 10 µm.

The first area may comprise a plurality of functional regions spaced apart by non-functional regions in a first arrangement, and the second area may comprise a plurality of functional regions spaced apart by non-functional regions in a second arrangement different from the first arrangement. For example the first area may comprise a plurality of functional regions spaced apart by non-functional regions having a first dimension so as to provide a combined effect to a viewer, and the second area may comprise a plurality of functional regions spaced apart by non-functional regions having a second dimension different to the dimensions of the non-functional regions in the first area, so as to provide a different combined effect to a viewer. This is particularly advantageous when the functional regions in the first and second areas are substantially identical (for example linear microprisms), as the optical effect provided by the first and second areas are controlled by the spacings between the microprisms. Of course, more than two optically different areas may be provided in the light control layer, for example in order to provide an RGB screen comprising three optically distinct areas corresponding to three colour channels. Preferably, the light control layer comprises at least three areas comprising different respective arrangements of functional regions. Advantageously, such a security device comprises three or more optically distinct areas.

In one example the first area consists substantially of functional regions and the second region comprises a plurality of functional regions spaced apart by non-functional regions. In this case the first area does not comprise any non-functional regions such that it exhibits the second optical effect.

At least one area may not be discernible to the naked eye, and may have a dimension less than 150 µm, preferably less than 100 µm and more preferably less than 70 µm.

In some examples the different optical effects exhibited by the different areas may be controlled by providing functional regions having different surface reliefs in the first and second areas.

The light control layer may be provided such that the functional and non-functional regions are formed in a single step, for example by an embossing, extrusion or cast curing process. An embossing die is typically provided having a surface structure corresponding to the desired light control layer. The light control layer typically comprises a UV curable material. Suitable UV curable materials may comprise a resin which may typically be of one of two types, namely:

a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.

b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing is typically UV radiation but could comprise electron beam, visible, or even infra-red or higher wavelength radiation, depending upon the material, its absorbance and the process used. Examples of suitable curable materials include UV curable acrylic based clear embossing lacquers or those based on other compounds such as nitro-cellulose. A suitable UV curable lacquer is the product UVF-203 from Kingfisher Ink Limited or photopolymer NOA61 available from Norland Products. Inc., New Jersey.

The curable material could be elastomeric and therefore of increased flexibility. An example of a suitable elastomeric curable material is aliphatic urethane acrylate (with suitable cross-linking additive such as polyaziridine).

Alternatively, the step of providing the light control layer may comprise providing a surface relief over at least a part of the colour shifting element, and selectively modifying a part of the surface relief so as to provide a non-functional region at the modified part. This feature is particularly advantageous. Providing such a surface relief may be considered as providing a "blank" light control layer, as no non-functional regions are present. Such a "blank" light control layer may be provided over at least a part of a colour shifting element, and the blank light control layer selectively modified as desired in order to generate non-functional regions and therefore form the finished light control layer. Such a blank light control layer would typically comprise a plurality of substantially identical microstructures.

The selectively modifying may comprise introducing a material into at least one depression of the surface relief so as to form a planar region. Typically the material has a refractive index substantially the same as that of the light control layer. This enables regions of the originally provided surface relief to be modified in order to form non-functional regions such that the optical effect provided by the non-functional regions is substantially the same as the optical effect if there were no light control layer present. In other words, the optical effect generated by the modified non-functional regions is the same as the optical effect generated solely by the colour shifting element (i.e. the first optical effect). In order that the modified part(s) of the surface relief provide the same optical effect as the colour shifting element in isolation, the material is added such that the light control layer at the modified part comprises a planar region, typically comprising a planar surface parallel with the colour shifting element.

Preferably, the material is a printable resin, and can be selectively introduced to a part of the surface relief by digital printing. The digital printing may be ink jet printing or laser printing for example. This feature of the invention is particularly advantageous. For example, a plurality of "blank" security devices, each comprising a "blank" light control layer surface relief, may be provided to a security device manufacturer, and one or more non-functional regions can be formed in the surface reliefs of the security devices, enabling the provision of a plurality of unique security devices. The use of digital printing advantageously allows for accurate spatial precision in the provision of the non-perceptible non-functional region(s), creating security devices that are easy to authenticate and yet difficult to counterfeit. Advantageously, the non-functional regions may be formed such that the combined optical effect exhibited by a combination of the functional and non-functional regions (e.g. a resultant colour) defines indicia, for example an image or serial number. Such "personalisation" of the security devices beneficially provides a further level of security.

In a further example the material may be a varnish, which may typically be applied by one of flexographic, lithographic or screen printing.

Alternatively or in addition to the addition of material to the surface relief, the selectively modifying may include removing at least a part of the surface relief. In a corresponding manner to the addition of material, removing at least a part of the surface relief modifies the optical effect produced by the modified part(s) of the security device. For example, at least one elevation of the surface relief may be removed such that, at that part of the security device, the optical effect provided is the optical effect generated by the colour shifting element in isolation (i.e. the first optical effect). For example, the surface relief may comprise a plurality of microprisms, and selected microprisms may be removed to form non-functional regions. By removing part (s) of the surface relief, a plurality of unique security devices can be formed in a similar manner to that described above in relation to the addition of material.

The selective modification may comprise deforming at least a part of the surface relief so as to form a planar region of the light control layer, said planar region defining a non-functional region. Here the term "deforming" means changing the structure of the surface relief. Typically in this instance, at least one elevation of the surface relief is deformed so as to form a planar region of the light control layer such that the optical effect at that part of the security device is the optical effect generated by the colour shifting layer in the absence of a light control layer. Such a planar region typically comprises a planar surface parallel with the colour shifting element.

Typically, in the case where the selective modification of the surface relief includes removing or deforming at least a part of the surface relief, the light control layer comprises a heat transformable material, and the selectively modifying comprises applying heat energy to the heat transformable material. This is typically done using a radiation source such as a laser through a laser ablation process, or by applying heat energy through thermal conduction with an applied member such as a linear or rotary embossing die in a so-called "hot-embossing" process.

In a similar manner to digital printing, the use of a laser allows accurate and fast modification of the surface relief so as to define non-functional regions that are not perceptible to the naked eye, allowing for fast, easy and efficient formation of unique security devices.

It is envisaged that the three forms of selectively modifying the surface relief described above (the addition of material, the removal of a part of the surface relief and the deforming of a part of the surface relief) may be applied either individually or in combination.

Typically, the surface relief of a functional region comprises at least one microstructure. An individual microstructure may have a dimension (e.g. width) typically in the range of 1-100 µm, more preferably 5-70 µm, and the height of an individual microstructure is preferably in the range of 1-100 µm, more preferably 5-40 µm. Preferably, such a microstructure is a linear microprism and the surface relief comprises an array of linear microprisms.

A number of different surface reliefs are envisaged. For example, the surface relief may comprise two or more arrays of linear microprisms, wherein the long axes of one array are angularly offset from the axes of the other array. A functional region comprising such a surface structure would provide a rotational optical effect as well as the colour shifting effect dependent on a tilt angle of the security device, wherein the rotational effect is dependent on the azimuthal angle of viewing with respect to the arrays of linear micro prisms. The optical effect due to the presence of a microprism array will be more readily observed when the device is viewed in an azimuthal direction perpendicular to the long axes of the array rather than in an azimuthal direction parallel to the long axes of the array.

Other forms of microprismatic structures are envisaged, for example structures comprising microprisms having an asymmetrical structure or a repeating faceted structure.

The microstructure may be a one dimensional microstructure. By "one dimensional" it is meant that optical effect provided by the microstructure is primarily observed in one rotational viewing direction with respect to an individual microstructure, typically perpendicular to a long axis of the microstructure. However, a surface relief comprising a two dimensional microstructure is also envisaged wherein the optical effect due to the presence of the microstructure is readily observed at two or more rotational viewing directions. Examples of such a two-dimensional microstructure include corner cubes and pyramidal structures. The surface relief may alternatively comprise a lenticular array having a curved surface structure.

Where the surface relief of a functional region comprises at least one microstructure, two or more functional regions may be spaced apart along a direction parallel to a long axis of the at least one microstructure. Alternatively or in addition, the functional regions may be spaced apart along a direction perpendicular to a long axis of the at least one microstructure.

According to a second aspect of the present invention there is provided a security device comprising; a colour-shifting element that provides a first optical effect, and; a light control layer covering at least a part of the colourshifting element, wherein; the light control layer comprises a functional region and at least one non-functional region, wherein the functional region comprises a surface relief adapted to modify the angle of light from the colour shifting element so as to generate a second optical effect different from the first optical effect, and wherein the non-functional region does not substantially modify the angle of light from the colour shifting element, and; wherein the at least one non-functional region is not discernible to the naked eye.

Examples of colour shifting elements that may be used in the security device of the second aspect include photonic crystals, liquid crystals, interference pigments, pearlescent pigments, structured interference materials or thin film interference structures including Bragg stacks. A particularly suitable material for the colour shifting element is a liquid crystal film.

In general the colour shifting element may be substantially opaque or partially transparent. A partially transparent colour shifting element (for example a liquid crystal film) transmits at least some of the light that is incident upon it as well as providing an optical effect in reflection. An example of a substantially opaque colour shifting element is an optically variable pigment. Optically variable pigments having a colour shift between two distinct colours, with the colour shift being dependent on the viewing angle, are well known. The production of these pigments, their use and their characteristic features are described in, inter-alia, U.S. Pat. Nos. 4,434,010, 5,059,245, 5,084,351, 5,135,812, 5,171,363, 5,571,624, EP-A-0341002, EP-A-0736073, EP-A-668329, EP-A-0741170 and EP-A-1114102. Optically variable pigments having a viewing angle-dependent shift of colour are based on a stack of superposed thin-film layers with different optical characteristics. The hue, the amount of colour-shifting and the chromaticity of such thin-film structures depend, inter alia, on the material constituting the layers, the sequence and the number of layers, the layer thickness, as well as on the production process. Generally, optically variable pigments comprise an opaque totally reflecting layer, a dielectric layer of a low refractive index material (i.e. with an index of refraction of 1.65 or less) deposited on top of the opaque layer and a semi-transparent partially reflecting layer applied on the dielectric layer.

The security device may be viewed in reflection or transmission. If the device is intended to be viewed in reflection and comprises a partially transparent colour shifting element such as a liquid crystal film, it is desirable to provide an additional light-absorbing element comprising a light-absorbing material present under the colour shifting element (i.e. such that the colour shifting layer is positioned between the light-absorbing material and the viewer). This is because the colour shifting material will only reflect certain wavelengths of light. Therefore, the presence of a light-absorbing material under the colour shifting element substantially absorbs light that is transmitted through the colour shifting element, meaning that light reflected from the colour shifting element dominates. Typically the absorbing element is positioned on a distal side of the colour shifting element with respect to the light control layer and operable to at least partially absorb light transmitted through the colour shifting element. Where the security device comprises a substantially opaque colour shifting element such as a printed ink comprising an optically variable pigment, such an absorbing element is not required.

The colour shifting element and, optionally, a light absorbing element, may be formed on and supported by a carrier layer as is known in the art. Such a carrier layer may comprise a polymeric material such as polyethylene terephthalate (PET) or biaxially orientated polypropylene (BOPP), which are particularly suitable in the case of security elements to be incorporated into banknotes and passports such as security stripes or threads. Alternatively the carrier layer may comprise polycarbonate which is particularly suitable for multilayer substrates as used in passports and identity cards.

The at least one non-functional region is not discernible to the naked eye. Here this means that the dimensions of the at least one non-functional region are such that the non-functional region cannot be resolved (i.e. "seen") by the naked eye. Here the term "naked" means "unaided" (i.e. without the aid of a magnifying apparatus). It is generally accepted that the naked human eye cannot perceive dimensions smaller than approximately 150 µm. Therefore, the at least one non-functional region has a dimension less than 150 µm, preferably less than 100 µm, and more preferably less than 70 µm.

As the at least one non-functional region is not discernible to the naked eye, at least at one part of the security device, the first and second optical effects (generated by the non-functional and functional regions respectively) combine to form a third optical effect. Typically, at least at one viewing angle, the first optical effect exhibits a first colour, the second optical effect exhibits a second colour different from the first colour, and the third optical effect exhibits a resultant colour comprising the first and second colours. The at least one non-functional region not being discernible to the naked eye means that the viewer perceives a combination (i.e. "mixing") of the first and second colours in the form of a resultant colour, rather than two distinct regions of different colour, as would be the case if the non-functional region was discernible to the naked eye.

The at least one non-functional region may comprise a region where no light control layer material is present. In other words, the at least one non-functional region may comprise a "gap" in the light control layer such that light from the colour shifting element does not pass through the material (typically a polymer) forming the light control layer. In this scenario, the non-functional region is still considered a part of the overall structure of the light control layer.

The at least one non-functional region may comprise a planar region. Such a planar region typically comprises a planar surface substantially parallel to the colour shifting element, such that light from the colour shifting element is not refracted substantially differently to how it would be if the colour shifting element was provided in isolation. In this manner, the optical effect exhibited by such a planar region is substantially the first optical effect generated by the colour shifting element.

Typically, the light control layer comprises a plurality of functional regions spaced apart by non-functional regions. The functional regions may be spaced apart in a periodic or a non-periodic manner, with the different spacings of the functional regions giving rise to different combined optical effects exhibited to a viewer. Different areas of the light control layer may comprise different arrangements and spacings of the functional and non-functional regions. For example the light control layer may comprise first and second areas, wherein the first area comprises a first arrangement of functional regions and the second area comprises a second arrangement of functional regions such that the first and second areas provide different optical effects to a viewer. In practice, this allows a security device to be provided which exhibits areas of different colour to a viewer upon tilting. Moreover, such areas may define pixels of a complex colour image exhibited by the security device. In such a case, the areas defining the pixels would typically each not be discernible to the naked eye. For example, each pixel may comprise a combination of functional and functional regions having a combined dimension of less than 150 µm, preferably less than 70 µm.

The first area may comprise a plurality of functional regions spaced apart by non-functional regions in a first arrangement, and the second area may comprise a plurality of functional regions spaced apart by non-functional regions in a second arrangement different from the first arrangement. For example the first area may comprise a plurality of functional regions spaced apart by non-functional regions having a first dimension so as to provide a combined effect to a viewer, and the second area may comprise a plurality of functional regions spaced apart by non-functional regions having a second dimension different to the dimensions of the non-functional regions in the first area, so as to provide a different combined effect to a viewer. This is particularly advantageous when the functional regions in the first and second areas are substantially identical (for example linear microprisms), as the optical effect provided by the first and second areas are controlled by the spacings between the microprisms. Of course, more than two optically different areas may be provided in the light control layer, for example in order to provide an RGB screen comprising three optically distinct areas corresponding to three colour channels. Preferably, the light control layer comprises at least three areas comprising different respective arrangements of functional regions. Advantageously, such a security device comprises three or more optically distinct areas.

In one example the first area consists substantially of functional regions and the second region comprises a plurality of functional regions spaced apart by non-functional regions. In this case the first area does not comprise any non-functional regions such that it exhibits the second optical effect.

At least one area may not be discernible to the naked eye, and may have a dimension less than 150 µm, preferably less than 100 µm and more preferably less than 70 µm.

In some examples the different optical effects exhibited by the different areas may be controlled by providing functional regions having different surface reliefs in the first and second areas.

Typically, the surface relief of a functional region comprises at least one microstructure. An individual microstructure may have a dimension (e.g. width) typically in the range of 1-100 µm, more preferably 5-70 µm, and the height of an individual microstructure is preferably in the range of 1-100 µm, more preferably 5-40 µm. Preferably, such a microstructure is a linear microprism and the surface relief comprises an array of linear microprisms.

A number of different surface structures are envisaged. For example, the surface structure may comprise two or more arrays of linear microprisms, wherein the long axes of one array are angularly offset from the axes of the other array. A functional region comprising such a surface structure would provide a rotational optical effect as well as the colour shifting effect dependent on a tilt angle of the security device, wherein the rotational effect is dependent on the azimuthal angle of viewing with respect to the arrays of linear microprisms. The optical effect due to the presence of a microprism array will be more readily observed when the device is viewed in an azimuthal direction perpendicular to the long axes of the array rather than in an azimuthal direction parallel to the long axes of the array.

Other forms of microprismatic structures are envisaged, for example structures comprising microprisms having an asymmetrical structure or a repeating faceted structure.

The microstructure may be a one dimensional microstructure. By "one dimensional" it is meant that optical effect provided by the microstructure is primarily observed in one rotational viewing direction with respect to an individual microstructure, typically perpendicular to a long axis of the microstructure. However, a surface relief comprising a two dimensional microstructure is also envisaged wherein the optical effect due to the presence of the microstructure is readily observed at two or more rotational viewing directions. Examples of such a two-dimensional microstructure include corner cubes and pyramidal structures. The surface relief may alternatively comprise a lenticular array having a curved surface structure.

Where the surface relief of a functional region comprises at least one microstructure, two or more functional regions may be spaced apart along a direction parallel to a long axis of the at least one microstructure. Alternatively or in addition, the functional regions may be spaced apart along a direction perpendicular to a long axis of the at least one microstructure.

The light control layer may comprise a polymer and may be formed by one of embossing, extrusion or cast curing. Preferably, the light control layer comprises a UV curable material. Suitable UV curable materials may comprise a resin which may typically be of one of two types, namely:

a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.

b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing is typically UV radiation but could comprise electron beam, visible, or infra-red or higher wavelength radiation, depending upon the material, its absorbance and the process used. Examples of suitable curable materials include UV curable acrylic based clear embossing lacquers or those based on other compounds such as nitro-cellulose. A suitable UV curable lacquer is the product UVF-203 from Kingfisher Ink Limited or photopolymer NOA61 available from Norland Products. Inc., New Jersey.

The curable material could be elastomeric and therefore of increased flexibility. An example of a suitable elastomeric curable material is aliphatic urethane acrylate (with suitable cross-linking additive such as polyaziridine).

In accordance with a third aspect of the present invention there is provided a secure substrate comprising a base substrate and a security device according to the second aspect of the invention.

The security device may be applied to a surface of the base substrate, typically through the use of a pressure sensitive adhesive or by a hot stamping process. Alternatively, the security device may be at least partially embedded in the base substrate. This may be the case where the base substrate is the substrate for a passport security page. Such a security page is typically comprised of a plurality of overlapping planar layers that are fused (typically laminated) together as is known in the art. One such layer may comprise a colour shifting element, and a light control layer may be formed, in register with the colour shifting element, in an outer surface of the security page in order to define a security device embedded within the substrate. A final security device may be formed by selectively modifying the surface relief of the light control layer, as described above, advantageously enabling efficient provision of unique, personalised passport security pages.

Where a security device is at least partially embedded within a base substrate, the security device may be visible in at least one window in at least one surface of the secure substrate. This may be the case where the security device is provided in a bank note, for example as part of a security article taking the form of a windowed security thread.

In accordance with a fourth aspect of the present invention, there is provided a security document comprising the secure substrate of the third aspect, wherein the security document is a passport, banknote, security label, identification card, driving license or other document of value.

BRIEF DESCRIPTION OF THE DRAWINGS

The invention will now be described with reference to the attached drawings, in which:

FIGS. 2 to 7 illustrate schematic side views of example security devices according to the present invention;

FIG. 8 is a perspective aerial view of an example security device according to the invention;

FIG. 9 is a perspective aerial view of a further example security device according to the invention;

FIGS. 26 to 29 illustrate example documents of value and methods for integrating a security device into said documents of value.

DETAILED DESCRIPTION

Figure 1A:
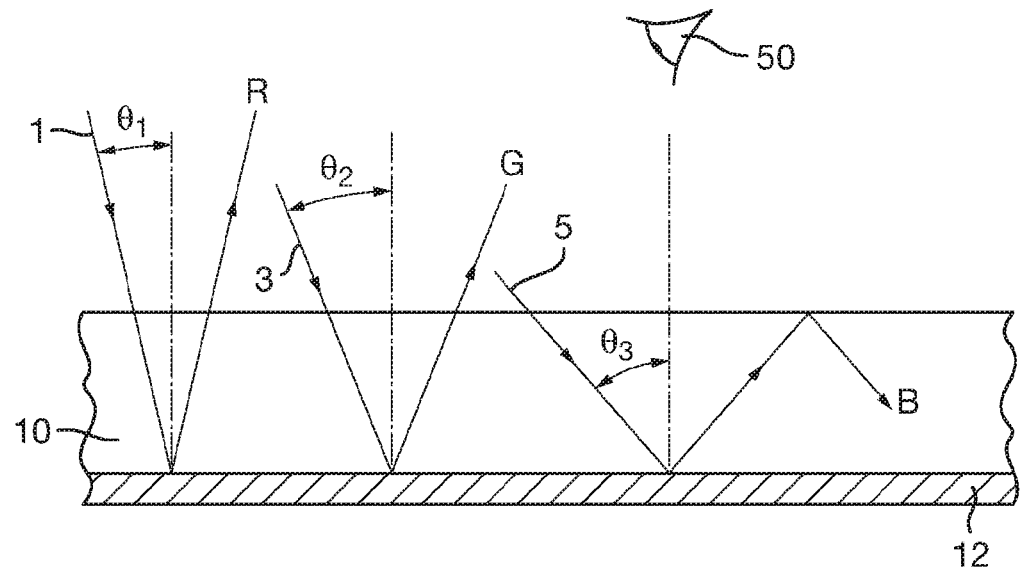
FIGS. 1a and 1b are schematic cross-sectional diagrams of the effect of light incident upon a colour shifting element, with and without the presence of a light control layer.
Figure 1B:
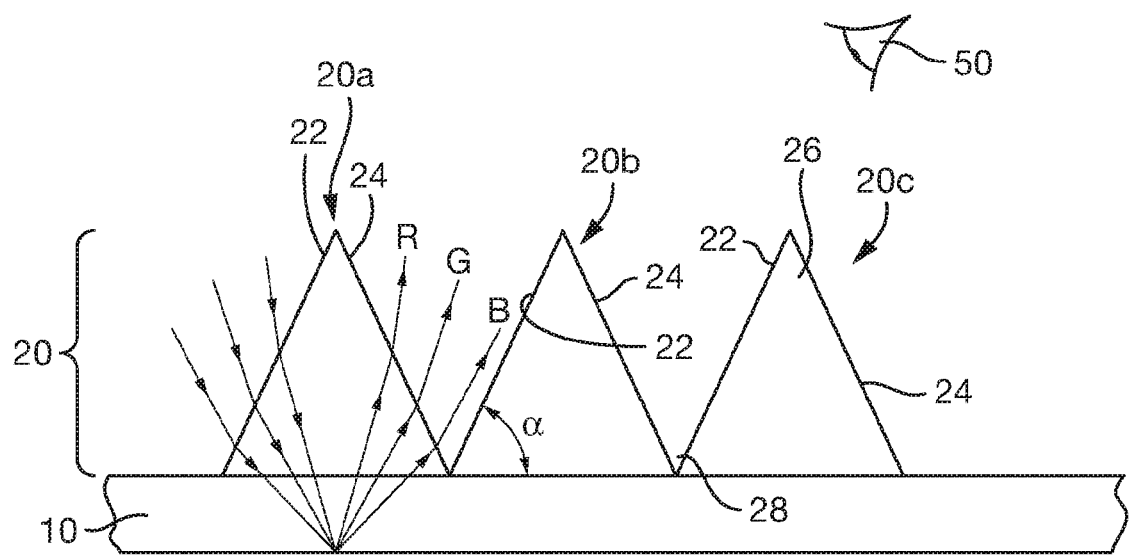

FIGS. 1a and 1b outline the general principles upon which the present invention is based. FIG. 1a is a schematic cross-sectional diagram of the effect of light incident upon a colour shifting element 10. All types of colour shifting materials may be used as the colour shifting element in the present invention, including inter alia photonic crystals, liquid crystals, interference pigments, pearlescent pigments, structured interference materials or thin film interference structures including Bragg stacks.

When light strikes the colour shifting element 10, some of the light is reflected. The wavelength of the reflected light depends on the structure and composition of the colour shifting element 10 and the reflected light will appear coloured to the viewer 50. The wavelength of the reflected light is also dependent on the angle of incidence, which results in a colour change perceived by the viewer 50 as the colour shifting element is tilted.

The optical effects of the colour shifting element 10 are illustrated schematically in FIG. 1a by light rays 1, 3 and 5 shown at angles of incidence $\Theta_1$, $\Theta_2$ and $\Theta_3$ respectively, where $\Theta_1 < \Theta_2 < \Theta_3$. Due to the colour shifting properties of the colour shifting element 10, light incident upon the colour shifting element 10 with an angle of incidence $\Theta_1$ will appear red (R) to the viewer 50, and light incident with an angle of incidence $\Theta_2$ will appear green (G). At a greater angle of incidence $\Theta_3$, light reflected by the colour shifting element 10 will have a wavelength corresponding to a blue colour (B), but will be totally internally reflected and therefore not observable to the viewer. The colour shifting element 10 will therefore exhibit a red to green colour shift when viewed and tilted away from a normal angle of viewing.

The colour shifting element 10 can be viewed either in reflection or transmission. If the colour shifting element 10 is partially transparent (such as a liquid crystal film) and it is desired to be viewed in reflection, it is preferable to place a dark absorbing layer (shown at 12) beneath the colour shifting element 10 in order to absorb the transmitted light. If on the other hand the colour shifting element is substantially opaque such as a printed ink comprising an optically variable pigment, such an absorbing layer 12 is not required.

FIG. 1b illustrates a light control layer 20 positioned above and in contact with a top surface of the colour shifting element 10 such that the light control layer 20 is situated between the colour shifting element 10 and the viewer 50. The light control layer preferably has a microprismatic structure (here an array of symmetrical linear triangular microprisms 20a, 20b, 20c having equal length facets 22, 24 at an angle α to the colour shifting element 10 and having long axes that extend into the plane of the page) having a series of elevations and depressions shown generally at 26 and 28 respectively, and comprises a material substantially transparent to visible light such that visible light is able to pass through it. As seen by the light rays in FIG. 1b, the light control layer reflects the light incident to, and reflected from, the colour shifting element 10. More specifically the red to green colour shift is observed at angles closer to a normal angle of viewing. Furthermore, due to the smaller difference in refractive index between the colour shifting element 10 and the light control layer 20 than between the colour shifting element 10 and the air, and the angled facets of the light control layer, blue light is no longer totally internally reflected by the light control layer and is instead observable to the viewer, as shown schematically in FIG. 1b at the light ray labelled B. The presence of light control layer 20 as seen in FIG. 1b therefore exhibits a red to green to blue colour shift effect to the viewer upon tilting, and this effect is observable closer to normal angles of viewing as compared to the colour shifting element 10 in isolation.

The light modification properties of the light control layer are most noticeable when the device is viewed in a direction perpendicular to the long axes of the microprisms of the light control layer.

FIG. 2 schematically illustrates a side view of an example security device 100 according to the present invention. The security device 100 is designed to be viewed in reflection and comprises a colour shifting element 10, an absorbing layer 12 and a light control layer 20 as described above with reference to FIGS. 1a and 1b. Here the light control layer 20 comprises a plurality of linear triangular microprisms 20a, 20b, 20c, 20d, 20e, 20f, with long axes extending into the plane of the page, that cover substantially the whole of the colour shifting element 10. In other words, light reflected from any region of the colour shifting element 10 will interact with, and be refracted by, the light control layer. Therefore, when a viewer 50 views the security device, each part of the security device will exhibit the same optical effect. For example, when viewed in a direction perpendicular to the long axes of the microprisms, the security device will homogenously exhibit a red to green to blue colour shift when tilted. The colour exhibited to the viewer by the security device 100 upon tilting is denoted by $C_a$.

The width of an individual microprism (here denoted by "a") is typically in the range of 1-100 μm, more preferably 5-70 μm, and the height of an individual microprism is preferably in the range of 1-100 μm, more preferably 5-40 μm.

Now consider an alternative security device 110, a schematic side view of which is illustrated in FIG. 3. Here the security device 110 comprises a colour shifting element 10, an absorbing layer 12 and a light control layer 30 comprising a plurality of equally spaced apart linear microprisms 30a, 30b, 30c, 30d. Each individual microprism is substantially the same as those of the light control layer described in FIG. 1, and has a width a. The individual microprisms are spaced apart by a distance b such that light reflected from a part of the colour shifting element 10 where no microprisms are present does not interact with the light control layer 30. In this manner, the light control layer 30 can be said to have functional regions (shown at "A") where microprisms are present, and non-functional regions (shown at "B") where no microprisms are present and light from the colour shifting element does not interact with the light control layer 30. The individual microprisms are spaced apart by a distance that is not resolvable by the naked human eye (i.e. not discernible to the naked human eye), with the distance being typically less than 70 μm.

The term "light control layer" includes the non-functional regions B where no light control layer material is present. In other words, the gaps between adjacent microprisms that define the non-functional regions B are an integral part of the structure of the light control layer. In general, the light control layer can be seen as the region extending between the colour shifting element 10 and the uppermost part of a microprism of the light control layer, as illustrated at 30 in FIG. 3.

Light reflected from the colour shifting element 10 above which the functional regions A of the light control layer 30 are present will exhibit a red to green to blue colour shift on tilting of the security device away from a normal angle of viewing, in the same manner as described with reference to FIGS. 1b and 2. Light reflected from the colour shifting element above which the non-functional regions of the light control layer 30 are present will exhibit a red to green colour shift upon tilting, in the same manner as described with reference to FIG. 1a. The optical effect exhibited to a viewer 50 will be a combination of the optical effects generated by the functional and non-functional regions of the light control layer.

For example, at a particular angle of tilt of the security device 110 away from the normal, the functional regions A may exhibit a blue colour and the non-functional regions may exhibit a green colour. However, the dimensions of the non-functional regions B of the light control layer 30 are not discernible to the naked eye, and therefore the resultant colour exhibited to the viewer 50 will be a mixture of green and blue light provided in a ratio of the dimensions of the functional and non-functional regions of the light control layer. In the example of security device 110, the spacing between adjacent microprisms b is equal to the width of an individual microprism a, and so the resultant colour exhibited to a viewer 50 at an angle of tilt, denoted $C_{ab}$, will be a 50% ratio of the colours exhibited by the functional and non-functional regions of the light control layer 30.

Different ratios of the colours exhibited to a viewer may be provided according to the spacings between the functional regions of the light control layer, as illustrated by FIGS. 4 and 5. FIG. 4 illustrates an example security device 120 comprising a colour shifting element 10, an absorbing layer 12 and a light control layer 40. The light control layer 40 comprises a plurality of microprisms 40a, 40b, 40c having a width a and being spaced apart by a distance c so as do define functional (shown at A) and non-functional (shown at C) regions of the light control layer. In the example of FIG. 4, the distance c is greater than the width a of an individual microprism. Therefore, the resultant colour $C_{ac}$ exhibited to a viewer 50 at a certain angle of tilt will be composed of a ratio of the colour exhibited by the functional region to the colour exhibited by the non-functional region of less than 50%.

FIG. 5 illustrates an example security device 130 comprising a colour shifting element 10, an absorbing layer 12 and a light control layer 50 comprising a plurality of microprisms 50a, 50b, 50c, 50d, 50e spaced apart by a distance d so as do define functional (shown at A) and non-functional (shown at D) regions. In this example the distance d is smaller than the width a of an individual microprism. Therefore, the resultant colour $C_{ad}$ exhibited to a viewer 50 will be composed of a ratio of the colour exhibited by the functional region to the colour exhibited by the non-functional region of greater than 50%.

Figure 6:
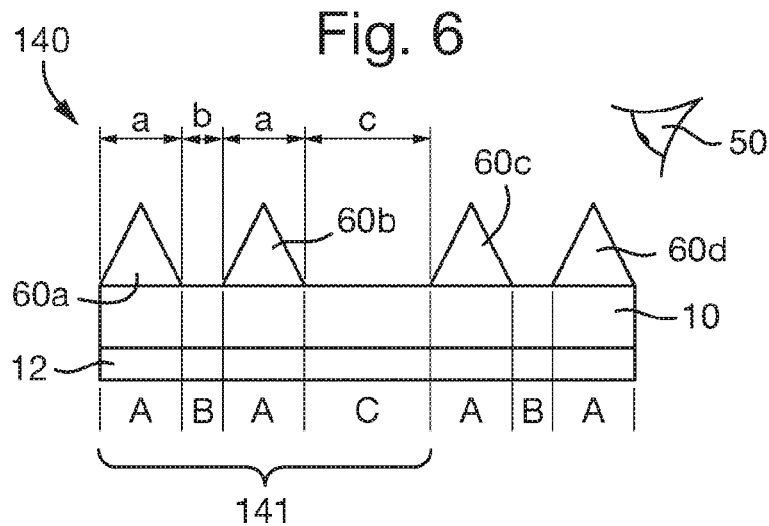

FIG. 6 illustrates an example security device 140 comprising a colour shifting element 10, a light absorbing layer 12 and a light control layer 60 comprising a plurality of microprisms 60a, 60b, 60c, 60d. Here, the microprisms of the light control layer are not spaced apart by the equal distances. Specifically, adjacent microprisms 60a and 60b, and 60c and 60d are spaced apart by a distance b, thereby defining non-functional regions B. Adjacent microprisms 60b, 60c are spaced apart by a distance c, thus defining non-functional region C. The resultant colour exhibited to a viewer 50 at a certain angle of tilt will be a ratio of the functional regions A, and non-functional regions B and C, and is denoted $C_{abc}$. The spacings between adjacent microprisms seen in FIG. 6 are repeated in a periodic manner, with a repeating unit shown at 141.

Figure 7:
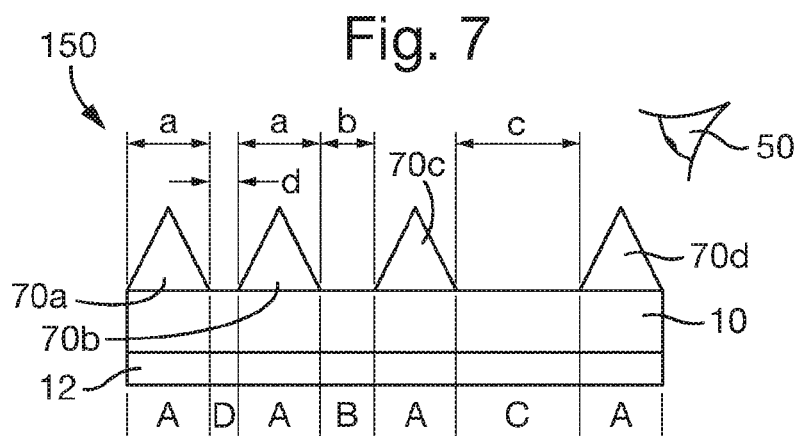

FIG. 7 illustrates a further example security device 150 comprising a colour shifting element 10, a light absorbing layer 12 and a light control layer 70 comprising a plurality of microprisms 70a, 70b, 70c, 70d with varying spacings. Specifically microprisms 70a and 70b are spaced apart by a distance d, thereby defining non-functional region D. Adjacent microprisms 70b and 70c are spaced apart by a distance b, thereby defining non-functional region B, and adjacent microprisms 70c and 70d are spaced apart by a distance c, thereby defining non-functional region C. The resultant colour exhibited to a viewer 50 at a certain angle of tilt away from normal viewing will be a ratio of the functional regions A, and non-functional regions B, C and D, and is denoted $C_{abcd}$. The spacings between the adjacent microprisms may be repeated periodically, or alternatively the microprisms may be spaced apart in a non-periodic manner.

In FIGS. 3 to 7 described above, each of the spacing dimensions a, b, c and d are not perceptible to the naked human eye.

In the schematic illustrations of FIGS. 3 to 7, the non-functional regions are illustrated as gaps between microprisms where no light control layer material is present. However, in practice, where the light control layer is provided by a process such as cast curing, the non-functional regions will typically take the form of planar layers of light control material, as will be described below in reference to (and as illustrated in) FIG. 12. This applies to other schematic illustrations herein where the non-functional regions are illustrated as gaps with no light control material present.

FIG. 8 is a perspective aerial view of an example security device 200 comprising colour shifting element 10, absorbing element 12 and light control layer 210. The light control layer 210 comprises three arrays of linear microprisms 211, 212, 213. Each array comprises a plurality of parallel linear triangular microprisms, with each array being spaced apart along a direction parallel to the long axes of the microprisms, as shown at 215, 216. The distance (i.e. the "gap") between adjacent arrays is not discernible to the naked eye. Therefore, the light control layer 210 comprises functional regions defined by the arrays 211, 212 and 213, and non-functional regions defined by the gap regions 215, 216.

The optical effect exhibited by the functional regions of the light control layer 210 is most readily observed by a viewer 50 when the security device 200 is viewed along a direction perpendicular to the long axes of the microprisms, i.e. along the direction X-X' in FIG. 8. For the purposes of the following discussion, it will be assumed that the colour shifting element 10 exhibits a green colour at a certain angle of tilt of the security device 200 away from normal viewing, and the combination of the colour shifting element 10 and functional regions of light control layer 210 exhibits a blue colour at the same angle of tilt of the security device 200. However, the skilled person will appreciate that different colour replays may be provided dependent on at least the colour shifting element and light control layer used. Furthermore, for the purposes of the following discussion, the security device 200 has a length OP along a direction perpendicular to the long axes of the microprisms, and a width OQ along a direction parallel to the long axes of the microprisms.

The security device 200 shown in FIG. 8 will exhibit bands of different colour along its width OQ dependent upon the positioning of the functional and non-functional regions of the light control layer 210. The bands of different colour will appear perpendicular to the long axes of the microprisms. More specifically, moving along its width OQ, the security device 200 will exhibit a blue colour due to microprisms array 213; a resultant colour comprising a mixture of blue and green from a combination of the gap region 216 (green) and microprism arrays 213, 212 (blue); a blue colour due to microprism array 212, a resultant colour comprising a mixture of blue and green from a combination of gap region 215 (green) and microprism arrays 212, 211 (blue), and finally a blue colour due to microprism array 211. This banding of colour will appear along the length of security device OP as there are no non-functional regions (i.e. "gaps") present perpendicular to the long axes of the microprisms.

The gap regions 215, 216 are not discernible to the naked human eye. Therefore, moving along the width of the security device OQ, the viewer will not experience abrupt changes in colour, but rather a gradual change of colour dependent on the ratio of the functional and non-functional regions at specific points along OQ.

FIG. 9 is an aerial perspective view of a further example security device 230 comprising a colour shifting element 10, an absorbing layer 12, and light control layer 220. Here, light control layer 220 comprises a plurality of arrays of microprisms 220a, 220b, 220c, . . . 200i. Each array comprises a plurality of parallel linear triangular microprisms, and are spaced apart along directions parallel to their long axes (shown at 225, 226) and perpendicular to their long axes (shown at 227, 228). The light control layer 220 therefore comprises functional regions defined by the microprism arrays and non-functional regions defined by the gaps between the arrays. The non-functional regions are not discernible to the naked human eye.

The security device 230 will exhibit bands of different colour along its width OQ dependent upon the positioning of the functional and non-functional regions of the light control layer 220. These bands of different colour will appear perpendicular to the long axes of the microprisms. More specifically, when viewed along a direction X-X' and moving along OQ, the security device 230 will exhibit a blue colour due to microprism array 220i; a resultant colour comprising a mixture of blue and green from a combination of the gap region 226 (green) and microprism arrays 220i, 220f (blue); a blue colour due to microprism array 220f; a resultant colour comprising a mixture of blue and green from a combination of gap region 226 (green) and microprism arrays 220f, 220c (blue), and finally a blue colour due to microprism array 220c.

The security device 230 will furthermore exhibit bands of colour along its length OP, dependent upon the positioning of the functional and non-functional regions of the light control layer 220. These bands will appear parallel to the long axes of the microprisms. More specifically, moving along OP, the security device 230 will exhibit a blue colour due to microprism array 220i; a resultant colour comprising a mixture of green and blue from a combination of the gap region 227 (green) and the microprism arrays 220i, 220h (blue); a blue colour due to microprism array 220h; a resultant colour comprising a mixture of green and blue from a combination of the gap region 228 (green) and microprism arrays 220h, 220g (blue), and finally a blue colour due to microprism array 220g.

As described above in relation to FIG. 8, these bands will not exhibit abrupt changes in colour, but rather as a gradual change due to the changing ratio of functional and non-functional regions across the light control layer 220. Where the gaps parallel and perpendicular to the long axes of the microprisms intersect (for example at 229), further colour mixing effects will be exhibited due to the increased relative area of non-functional region of the light control layer 220.

FIG. 8 illustrates a light control layer where the microprism arrays (i.e. functional regions) are spaced apart by the same amount. Similarly, FIG. 9 illustrates a light control layer where the functional region microprism arrays are equally spaced apart along a direction parallel to their long axes, and equally spaced apart along a direction perpendicular to their long axes. Furthermore, the microprism arrays (i.e. functional regions) of FIG. 9 are aligned with each other both in a direction parallel with their long axes and in a direction parallel to their long axes.

Figure 10A:
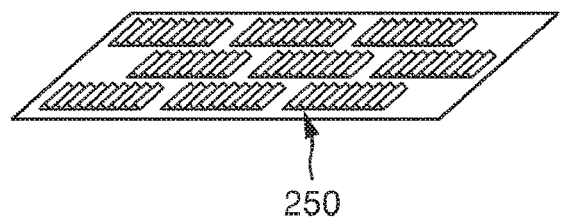
FIGS. 10a and 10b illustrate example light control layers that may be used in a security device according to the present invention.
Figure 10B:
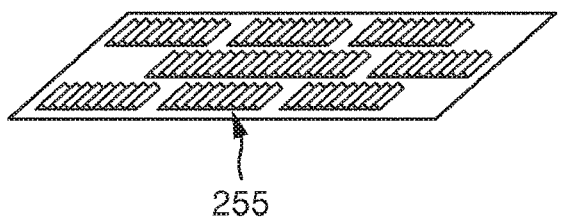

However, other arrangements of the spacing and (non-) alignment of the functional regions of such a light control layer are envisaged. For example, FIG. 10a illustrates a light control layer 250 comprising a plurality of microprism arrays offset from each other along a direction perpendicular to their long axes to as to define offset non-functional regions. As a further example, FIG. 10b illustrates an example light control layer 255 comprising a plurality of microprism arrays offset from each other along both directions parallel and perpendicular to their long axes, so as to define offset non-functional regions. Moreover, the spacings between adjacent microprism arrays are varied in FIG. 10b, defining different dimensioned non-functional regions. The offset and varying spacing of the arrays (i.e. functional regions of the light control layer) may be periodic or non-periodic.

Figure 11A:
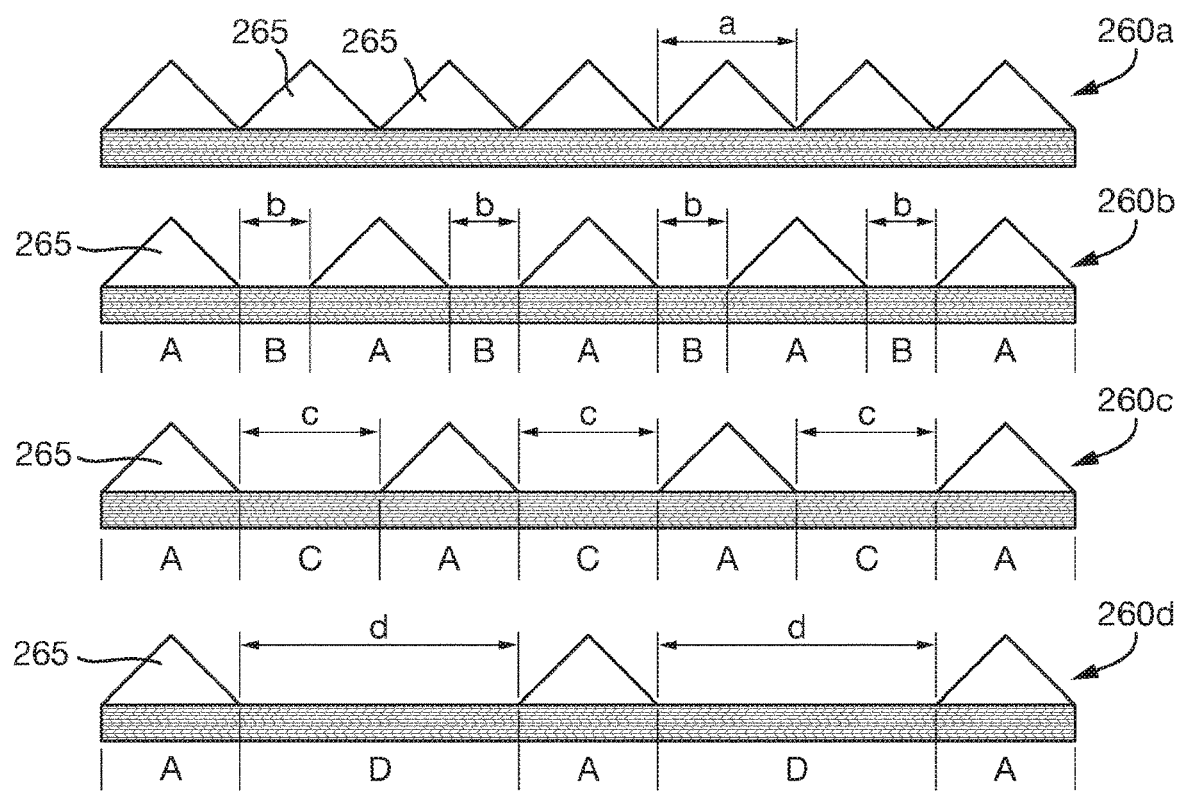
FIGS. 11a and 11b illustrate an example security device comprising a plurality of different areas exhibiting different optical effects.
Figure 11B:
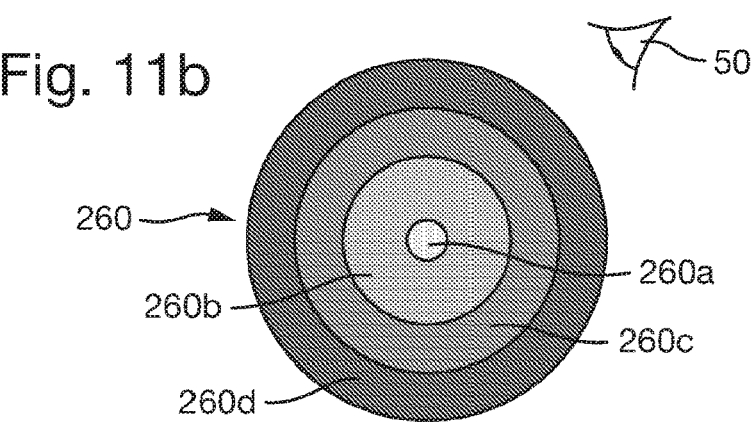

FIG. 11b is a plan view of an example security device 260 comprising a plurality of different areas 260a, 260b, 260c, 260d. Each area provides a different optical effect (represented schematically by different shading) to a viewer 50 due to differing arrangements of functional and non-functional regions in each area, as will be described with reference to FIG. 11a. Each area comprises a plurality of microprisms shown generally at 265. The microprisms in each area are substantially identical and have a width a. It is the varying spacings of the microprisms in each area that gives rise to the different optical effects.

More specifically, as shown in FIG. 11a, area 260a comprises an array of abutting linear microprisms 265, and does not comprise any non-functional regions. At least at one angle of tilt of the security device 260, area 260a will exhibit a colour $C_a$.

Area 260b comprises a plurality of regularly spaced apart microprisms 265, each microprism being spaced by a distance b that is not discernible to the naked eye, therefore defining a plurality of functional regions A and a plurality of non-functional regions B. The colour $C_{ab}$ exhibited to a viewer 50, at least at one angle of tilt, will therefore be a combination of the colours exhibited by the functional regions A and non-functional regions B, and is different to colour $C_a$.

Area 260c comprises a plurality of regularly spaced apart microprisms 265, each microprism being spaced by a distance c that is not discernible to the naked eye, therefore defining a plurality of functional regions A and a plurality of non-functional regions C. The colour $C_{ac}$ exhibited to a viewer 50, at least at one angle of tilt, will therefore be a combination of the colours exhibited by the functional regions A and non-functional regions C. The distance c is greater than the distance b, and so the colour $C_{ac}$ will be different to $C_{ab}$ (and $C_a$) due to the different ratios of functional and non-functional regions in areas 260a, 260b and 260c.

Area 260d comprises a plurality of regularly spaced apart microprisms 265, each microprism being spaced by a distance d that is not discernible to the naked eye, therefore defining a plurality of functional regions A and a plurality of non-functional regions D. The colour $C_{ad}$ exhibited to a viewer 50, at least at one angle of tilt, will therefore be a combination of the colours exhibited by the functional regions A and non-functional regions D. The distance d is greater than the distances b and c, and so the colour $C_{ad}$ will be different to $C_{ab}$ and $C_{ac}$ (and $C_a$) due to the different ratios of functional and non-functional regions in areas 260a, 260b, 260c and 260d.

The overall security device 260 will therefore exhibit, at least at one angle of tilt, regions of different colour provided by the areas 260a, 260b, 260c and 260d. The areas in security device 260 are arranged in a circular (260a) and annular (260b, 260c, 260d) manner in order to provide a memorable effect to a viewer, although other arrangements of such areas are envisaged. Furthermore, although each area 260a-260d comprises regularly spaced apart microprisms, it is envisaged that an area may comprise irregularly spaced microprisms.

The light control layer may be formed by a number of different processes including embossing, extrusion and cast curing as are known in the art. For example, the light control layer may be provided by forming a layer of curable material on (over or in contact with) a colour shifting element and subsequently embossing and curing the material to form the desired surface structure of the light control layer. The curing is typically performed by radiation curing with the radiation typically being UV radiation, but could comprise electron beam, visible, or infra-red or higher wavelength radiation, depending upon the material, its absorbance and the process used. Examples of suitable material for the light control layer are set out in the summary of the invention section above.

Typically an embossing master is created with a surface relief that corresponds to the desired light control layer. For example, elevations in the surface relief of the embossing master correspond to depressions in the desired light control layer, and depressions in the surface relief of the embossing master correspond to elevations in the light control layer. In this way the embossing master comprises a surface relief that is a negative of the desired light control layer.

Although typically the light control layer is formed above and in contact with the colour shifting element; in general, the light control layer only needs to be between the colour shifting element and a viewer such that light from the colour shifting element passes through the light control layer before reaching the viewer. For example, a layer of polymer material substantially transparent to visible light may be provided between the colour shifting element and the light control layer such that the colour shifting element is viewable through the light control layer. Typically the colour shifting element and light control layer are provided in register (i.e. alignment) with each other.

Figure 12:
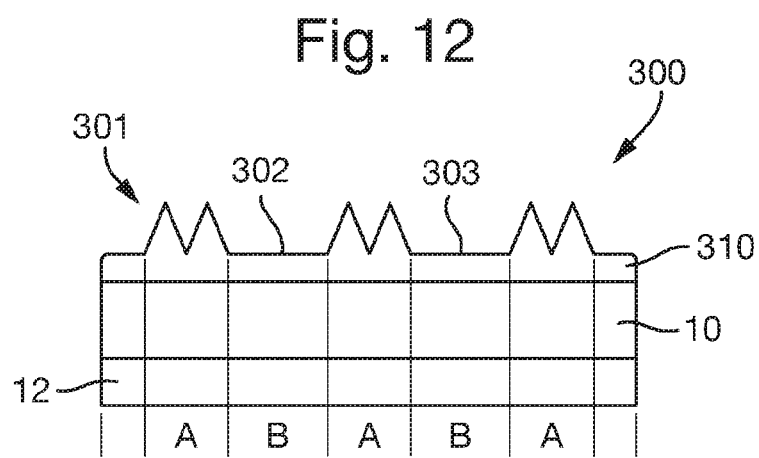
FIG. 12 is a schematic side view of an example security device according to the invention.

FIG. 12 shows an example security device 300 comprising a colour shifting element 10, an absorbing layer 12 and a light control layer shown generally at 301 formed in an embossing process where a layer of lacquer 310 is provided on the colour shifting element and subsequently embossed by an embossing master. The formed light control layer comprises functional regions (shown at A) comprising microprisms and non-functional regions (shown at B) comprising planar regions illustrated at 302 and 303. Even though there is lacquer present in the non-functional regions B, the lacquer here is formed having a planar surface substantially parallel with the colour shifting element. In this manner, the optical effect exhibited by the non-functional regions is substantially identical to the optical effect exhibited by the colour shifting element in isolation.

As has been explained above, the non-functional regions having the form seen in FIG. 12 apply to each of the schematic illustrations described herein.

Alternatively or in addition, an "unpatterned" or "blank" light control layer may be provided on the colour shifting element which may be subsequently selectively modified in order to provide a finished light control layer comprising the desired functional and non-functional regions. Such a blank light control layer typically comprises an array of microprisms that abut each other so as to cover substantially the entirety of the colour shifting element (as seen in FIG. 2) such that the light control layer is comprised substantially entirely of a functional region. A plurality of security devices comprising such blank light control layers may be provided, and then each one selectively modified in order to provide different light control layers exhibiting different optical effects. This advantageously means that a plurality of unique security devices may be efficiently produced without having to manufacture a corresponding plurality of unique embossing masters. The use of unique security devices provides a further layer of security by increasing the difficulty of counterfeiting.

Figure 13A:
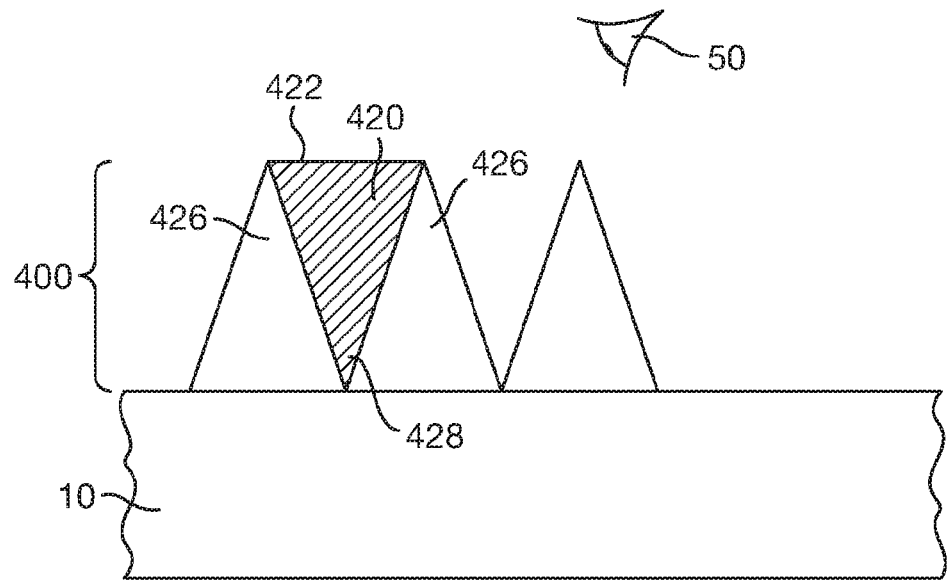
FIGS. 13a and 13b schematically illustrate the process of selectively modifying a light control layer of a security device according to the present invention.
Figure 13B:
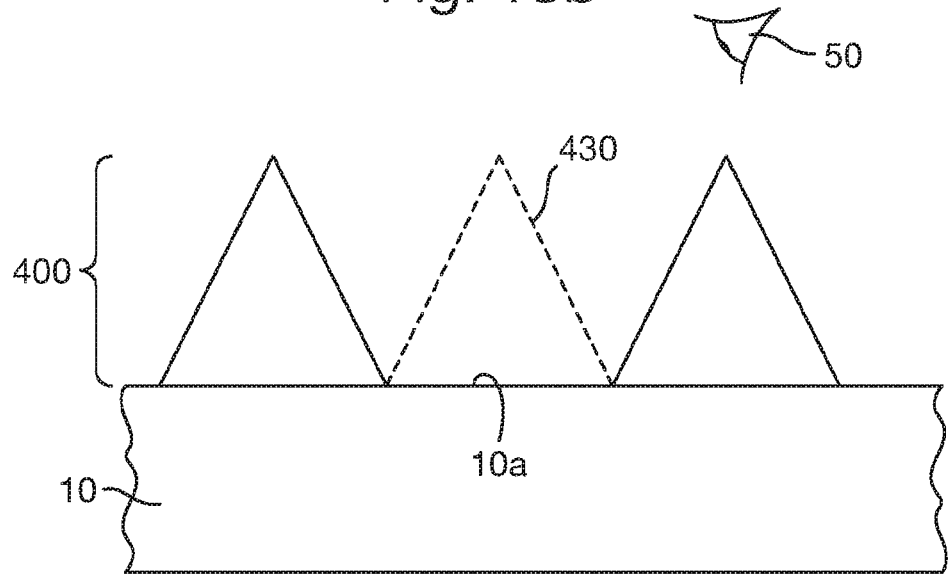

The concept of the selective modification will now be outlined with reference to FIGS. 13a and 13b. FIG. 13a schematically illustrates a first type of modification of a "blank" light control layer 400. A resin 420 is introduced into a depression 428 within the microprismatic structure of the blank light control layer 400, and the interstitial space between adjacent microprisms is substantially filled such that the modified part of the light control layer comprises a planar surface 422 extending between the peaks 426 of adjacent microprisms of the light control layer and parallel with the light control layer 10.

Preferably the resin 420 has a refractive index substantially identical to that of the light control layer 400 such that the modified part of the light control layer 400 takes the form of an optically homogenous planar layer. This means that the light reflected from the colour shifting element 10 is not significantly refracted by the modified part of the light control layer 20 and the viewer 50 therefore perceives a colour shifting effect substantially the same as if the light control layer were not present at that part. For example, at the modified part of the light control layer, blue light from the colour shifting layer will be totally internally reflected at the interface between the resin 420 and the air such that a red to green colour shift will be exhibited to the viewer rather than a red to blue colour shift. In this manner, a "blank" light control layer 400 can be selectively modified by the addition of resin in order to define at least one non-functional region.

Preferably, the resin 420 is a printable resin, and can be selectively introduced to a part of the light control layer by digital printing. The digital printing may be ink jet printing or laser printing for example. This feature of the invention is particularly advantageous. For example, a passport manufacturer may be provided with a plurality of security devices each comprising a colour shifting element and a blank light control layer. The passport manufacturer may then personalise each security device by digitally printing, onto the blank light control layer of the security device, material that modifies the light control layer such that the printed areas containing material generate a different optical effect. Specifically, the optical effect generated by the modified areas combines with the optical effect of the blank light control layer to produce a combined optical effect (typically a resultant colour). In this manner, indicia such as a serial number or portrait may be exhibited to a viewer, with the indicia being defined by the combined optical effect.

Digital printing advantageously allows for high spatial accuracy in the modification of the light control layer, thereby providing the ability to create non-functional regions within the light control layer that are not perceptible to the naked eye.

Examples of materials that may be added to the light control layer in order to selectively modify it include UV curable inkjet inks such as Mimaki® UV ink Clear 031-38U069C. Other suitable materials for UV curable inkjet include polyfunctional terminally unsaturated organic compounds including the polyesters of ethylenically unsaturated acids such as acrylic acid and methacrylic acid and a polyhydric alcohol. Examples of some of these polyfunctional compounds are the polyacrylates and polymethacrylates of trimethylolpropane, pentaerythritol, dipentaerythritol, ethylene glycol, triethylene glycol, propylene glycol, glycerin, sorbitol, neopentylglycol, 1,6-hexanediol and hydroxy-terminated polyesters, hydroxy-terminated epoxy resins, and hydroxy-terminated polyurethanes. Also included in this group of terminally unsaturated organic compounds are polyallyl and polyvinyl compounds such as diallyl phthalate and tetraallyloxyethane and divinyl adipate, butane divinyl ether and divinylbenzene.

In a further example, the material added to the light control layer may be a varnish, which may be a water based varnish or a UV curable varnish. The varnish may be typically applied by one of flexographic, lithographic or screen printing. Suitable UV curable materials may comprise a resin which may typically be of one of two types, namely:

a) Free radical cure resins, which are typically unsaturated resins or monomers, pre-polymers, oligomers and the like containing vinyl or acrylate unsaturation for example, and which cross-link through use of a photo initiator activated by the radiation source employed, for example UV radiation.

b) Cationic cure resins, in which ring opening (e.g. epoxy types) is effected using photo initiators or catalysts which generate ionic entities under the radiation source employed, for example UV radiation. The ring opening is followed by intermolecular cross-linking.

The radiation used to effect curing is typically UV radiation but could comprise electron beam, visible, or even infra-red or higher wavelength radiation, depending upon the material, its absorbance and the process used. Examples of suitable curable materials include UV curable acrylic based clear embossing lacquers or those based on other compounds such as nitro-cellulose. A suitable UV curable lacquer is the product UVF-203 from Kingfisher Ink Limited or photopolymer NOA61 available from Norland Products. Inc., New Jersey.

The curable material could be elastomeric and therefore of increased flexibility. An example of a suitable elastomeric curable material is aliphatic urethane acrylate (with suitable cross-linking additive such as polyaziridine).

Suitable water based varnishes include include vinyl resins such as UCAR™ VMCA Solution Vinyl Resin or UCAR™ VCMH Solution Vinyl Resin, both of which are supplied by The Dow Chemical Company and which are carboxy-functional terpolymers comprised of vinyl chloride, vinyl acetate and maleic acid. Varnishes including polyurethane resins are also suitable.

FIG. 13b illustrates a second modification of a blank light control layer 400, more specifically removal of a part of the light control layer 400 in order to define a non-functional region. Here a part (illustrated at 430) of the light control layer 400 is removed in order to expose a part 10a of the colour shifting element 10. Therefore, light rays reflected by the colour shifting layer 10 and leaving the colour shifting layer at part 10a will not be refracted by the modified light control layer and as such the effect exhibited to the viewer 50 will be the original red to green colour shift due to the colour shifting element rather than the red to blue colour shift due to the light control layer.

Alternatively or in addition, instead of removing part(s) of the light control layer 400, the light control layer 400 may be selectively deformed in order to leave a planar part of light control layer substantially abutting the colour shifting layer so as to effectively define a non-functional region.

Typically, in the case where the selective modification of the light control layer includes removing or deforming at least a part of the light control layer, the light control layer comprises a heat transformable material, and in such a case, the removal or deformation of at least a part of the light control layer comprises applying heat energy to the heat transformable material. This is typically done using a radiation source such as a laser through a laser ablation process, or by applying heat energy through thermal conduction with an applied member such as a linear or rotary embossing die in a so-called "hot-embossing" process. Such an embossing die will comprise a surface relief corresponding to the desired modification of the light control layer.

In a similar manner to digital printing, the use of a laser allows accurate and fast modification of the light control layer so as to provide non-functional regions that are not perceptible to the naked human eye.

Figure 14:
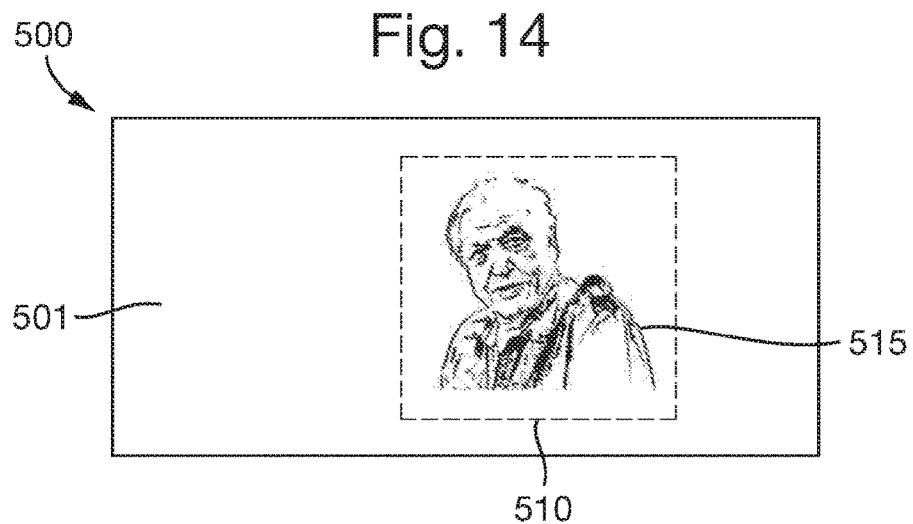
FIG. 14 is a schematic plan view of a bank note comprising a security device according to the invention.

The present invention may be utilised in order to form complex security devices exhibiting intricate coloured images upon tilting, which are extremely difficult to counterfeit. FIG. 14 illustrates an example bank note 500 comprising a bank note substrate 501 (which could be either paper or polymer) onto which a security device 510 is attached. The security device 510 exhibits a coloured image upon tilting away from a normal angle of viewing, the image here being a portrait shown generally at 515. The image is comprised of a plurality of pixels, with each pixel exhibiting a desired colour at a certain angle of tilt in order that the overall coloured image is exhibited to a viewer. Consider for example FIGS. 2 to 7 described above. Each of the surface reliefs 20, 30, 40, 50, 60, 70 in FIGS. 2 to 7, when provided over the same colour shifting element and absorbing layer, exhibit a different colour to a viewer for the same angle of tilt due to the differing ratios of functional and non-functional regions. Therefore, a complex coloured image may be formed by providing a light control layer over a colour shifting element, with the light control layer having a plurality of areas having differing ratios of functional and non-functional regions. Each of these areas can be seen to correspond to a pixel of the final image.

Figure 15A:
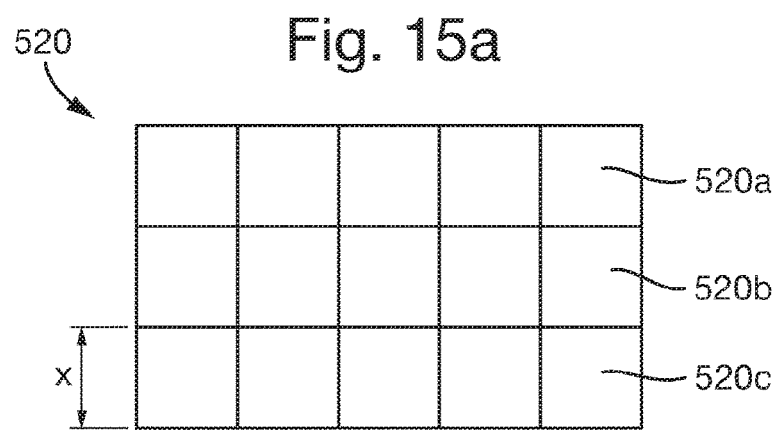
FIGS. 15a and 15b schematically illustrate a light control layer comprising pixels.

This concept is schematically illustrated in FIG. 15a, which shows a plan view of the light control layer 520 of security device 510. The light control layer 520 is divided into a plurality of pixels shown at 520a, 520b, 520c, with each pixel having a ratio of functional to non-functional regions corresponding to a desired colour to be exhibited by that pixel. Each pixel typically has a dimension (e.g. "length" as illustrated by x in FIG. 15a) that is not perceptible to the naked human eye—typically less than 150 μm, preferably less than 70 μm. The pixels can be used to create an RGB screen in order to form a complex coloured image as long as three different arrangements of functional and non-functional regions can fit within the dimensions of a pixel such that three distinct pixel types having distinct optical effects (e.g. colours) can be used.

Figure 15B:
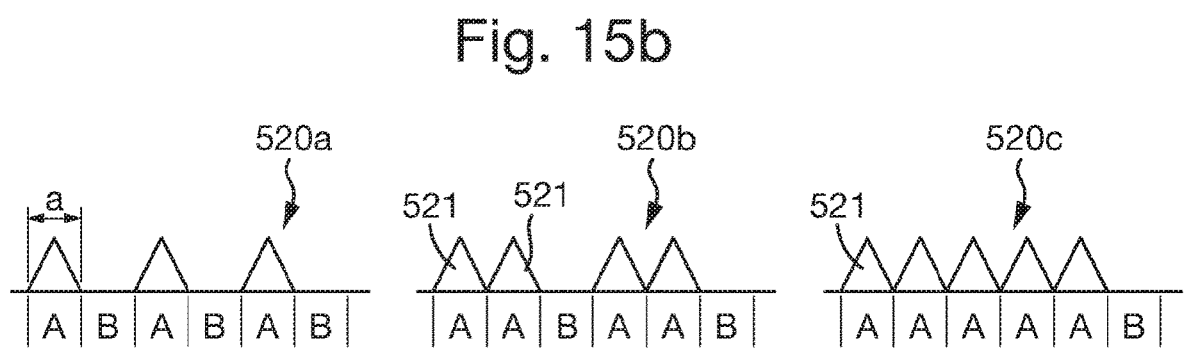

Take for example FIG. 15b which schematically illustrates this concept. Consider prismatic structures 521 that define functional regions A, and non-functional regions B between the prismatic structures. The functional and non-functional regions may have each have dimensions such that three distinct combinations of functional and non-functional regions can be provided within the dimensions of a pixel so as to create an RGB (or other colour combination) screen. For example, in FIG. 15b, each pixel has a dimension of 60 µm×60 µm, and comprises prismatic structures having a width a of 10 µm and a length (extending into the plane of the paper) of 60 µm. The non-functional regions B have a width equal to that of the prismatic structures (here 10 µm). Pixel 520a comprises the combination ABABAB . . . such that the percentage of functional region within the pixel (the "efficiency" of the pixel) is 50%; pixel 520b comprises the combination AABAAB . . . to give an efficiency of 66.6%; and pixel 520c comprises the combination AAAAAB to give an efficiency of 83.3%. Other combinations and dimensions may be used such that three distinct combinations of functional and non-functional region may be formed within the dimensions of an individual pixel.

Figure 16:
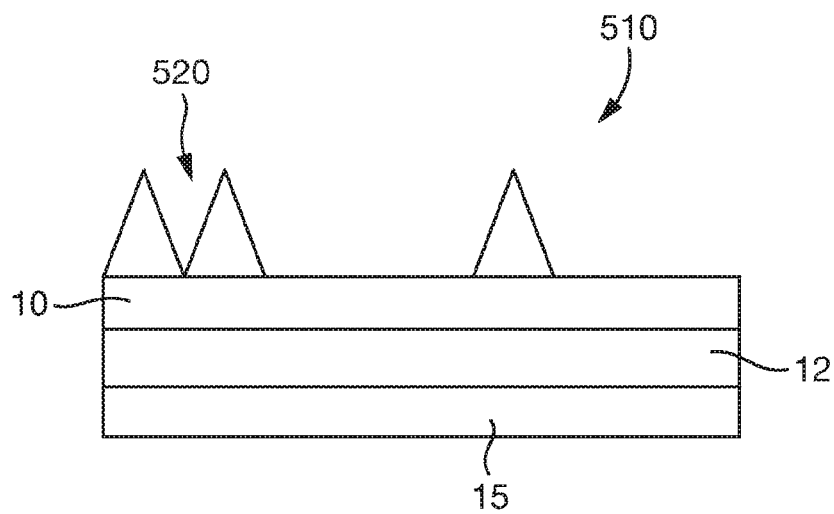
FIG. 16 is a schematic side view of an example security device according to the invention.

FIG. 14 above illustrated a bank note 500 comprising a security device 510, with the security device attached to the bank note substrate 501. FIG. 16 schematically illustrates a security device 510 which comprises a colour shifting element 10, absorbing layer 12, light control layer 520 and, optionally, an adhesive layer 15, such as a pressure sensitive adhesive. The adhesive layer 15 is formed on an opposing surface of the absorbing layer 12 to the colour shifting element 10 such that the adhesive layer 12 is the bottommost layer of the security device 510. The adhesive layer 15 allows the security device 510 to be easily attached to the bank note substrate 501. In general, any security device according to the present invention may comprise such an adhesive layer, which allows the security device to be easily attached to a variety of objects such as bank cards, certificates of authenticity, bank notes, visas, passports, driving licenses, immigration cards and identification cards, as well as containers and other three dimensional objects. The adhesive layer 15 may be composed of a variety of adhesive materials such as acrylic-based polymers, and polymers based on ethylene vinyl acetate, polyamides, urethane, polyisobutylene, polybutadiene, plasticised rubbers, combinations thereof, and the like.

Alternatively, a hot stamping process can be utilised to attach a security device to an object, as is known in the art.

Figure 17:
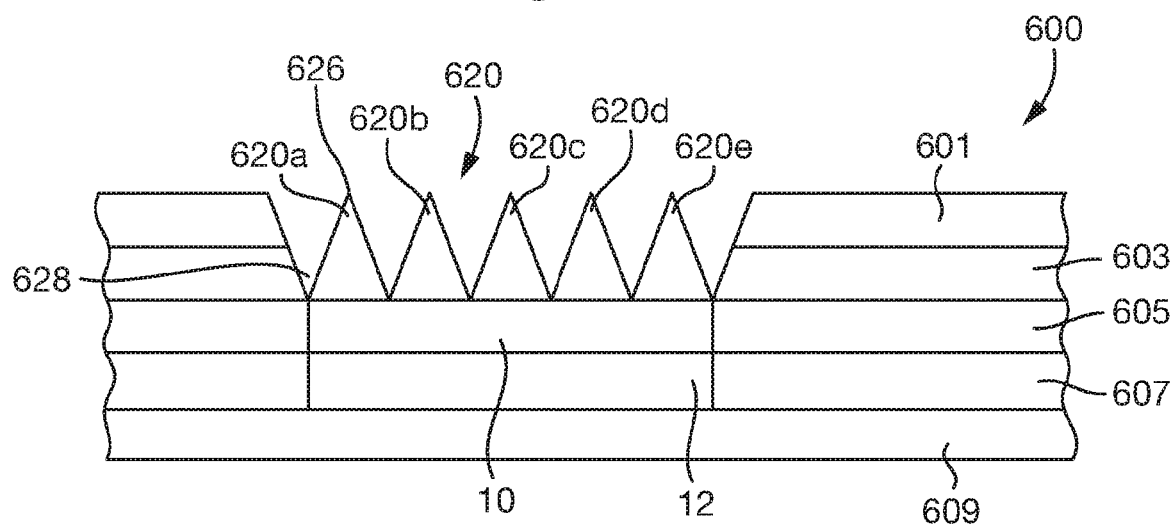
FIG. 17 is a schematic side view of a passport security page comprising a security device according to the invention.

As a further alternative, the security device may be integrated within a security document substrate. FIG. 17 illustrates a schematic side-on view of passport security page substrate 600 for a passport security page. Such a security page is provided within the passport booklet and is usually the second or penultimate page, typically located between one of the visa pages and the cover. The security page substrate 600 comprises a plurality of planar layers 601, 603, 605, 607 and 609 fused together to form a laminar structure which is rigid or semi-rigid. The layers are typically comprised of a thermoplastic polymer such as polycarbonate or polyethylene and are fused together by a laminating process as is known in the art.

The security page substrate 600 comprises opposing outer layers 601, 609 and a plurality of interior layers 603, 605 and 607. A colour shifting element 10 is provided on second interior layer 605 and an absorbing layer 12 is provided below and in register with the colour shifting element on third interior layer 607. A light control structure 620 is provided above and in register with the colour shifting element 10, and extends through the top outer layer 601 and first internal layer 603 such that the light control structure 620 is substantially adjacent the colour shifting element. In other examples the light control structure may extend through only the top outer layer, or through more than one internal layer depending on the construction of the security laminate and positioning of the colour shifting element.

The colour shifting element 10 and absorbing layer 12 may be provided on their respective layers prior to the fusing step, or may be inserted as a "plug" into the substrate after the layers have been fused together, as is known in the art.

The light control layer 620 is typically formed by a hot embossing process, where the initially planar layers 601 and 603 are brought into intimate contact with a heated embossing cylinder or die, the surface of which comprises a series of elevations and depressions corresponding to the desired microprismatic structure.

Together, the colour shifting element 10, absorbing layer 12 and the light control layer 620 define a security device embedded within the passport security page substrate 600.

Typically the opposing outer layers 601 and 609 are substantially transparent to visible light, as well as the first internal layer 603. Internal layers 605 and 607 are typically substantially opaque. The topmost outer layer 601 and the first internal layer 603 are substantially transparent such that the colour shifting element 10 is visible through the top of the passport security page substrate. However, first internal layer 603 may alternatively be substantially opaque and comprise a window region in register with the colour shifting element 10 such that the colour shifting element 10 is visible through the topmost outer layer 601. However, the colour shifting element 10 and light control layer 620 may be spaced apart as long as the layers between the colour shifting element 10 and the light control layer 620 each comprise a region substantially transparent to visible light such that the colour shifting element is visible through the light control layer.

It is envisaged that a plurality of "blank" passport security page substrates 600, each comprising a "blank" light control layer 620 may be provided to a passport manufacturer. Each blank substrate may then be personalised by selectively modifying the blank light control layer 620 to control the colour exhibited to a viewer, as has been described above. This advantageously allows for efficient production of a plurality of unique passport security pages, increasing the difficulty of counterfeiting.

A security device may be integrated within a security label substrate, in which case the security label substrate may comprise a tamper-evident layer. Further examples of embedding a security device into a document of value are provided with reference to FIGS. 26 to 29.

Figure 18:
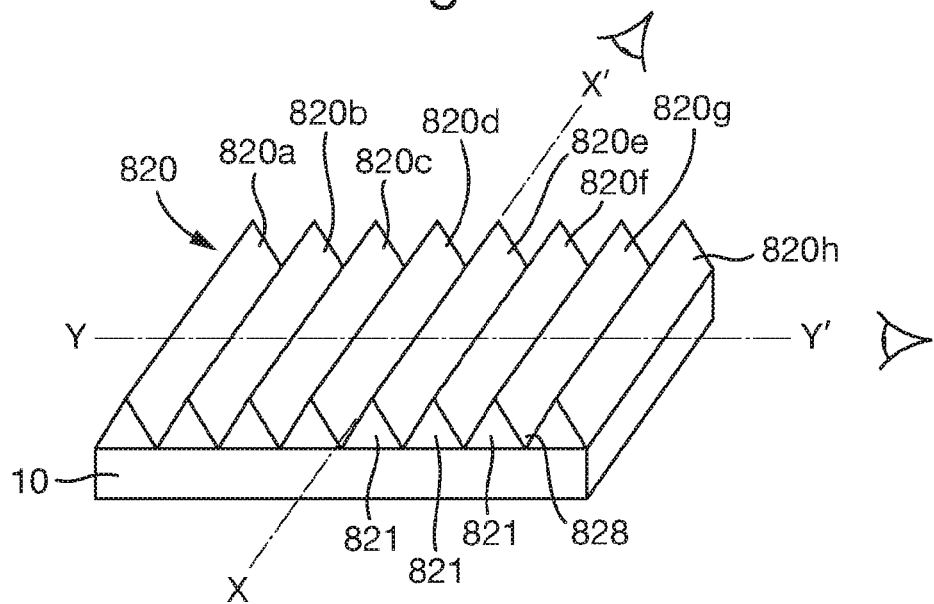
FIGS. 18 to 25 are aerial views of various surface reliefs that may be used in a light control layer of a security device according to the invention.

The above figures have been described with respect to the functional region(s) of a light control layer comprising a microprismatic structure comprising a plurality of linear microprisms. FIG. 18 is an aerial perspective view of such a functional region, shown generally at 820. The microprismatic structure comprises an array of linear microprisms 820a, 820b . . . 820h each having a triangular cross section (shown generally at 821). The linear microprisms substantially abut each other along their long axes, and are parallel with each other about their long axes. The array of microprisms defines a series of elevations 26 and depressions 28.

Opposing end faces of an individual microprism are substantially parallel, and such a microprism is known as a "one-dimensional" microprism. The microprismatic structure 820 shown in FIG. 18 is therefore a one-dimensional microstructure as it comprises a plurality of one-dimensional microprisms. The term "one-dimensional" is used because the optical effect produced by the microprism is significantly stronger (i.e. more noticeable to a viewer) in one direction of viewing. In the example of FIG. 18, the effect of the surface relief (e.g., an exhibited red to blue colour shift) is most noticeable if viewed along a direction Y-Y' perpendicular to the long axes of the microprisms.

The optical effect exhibited by the light control layer is therefore anisotropic. If the security device comprising the light control layer is rotated within its plane, the exhibited optical effect due to the combination of colour shifting element and light control layer is seen most readily when the device is tilted with the viewing direction perpendicular to the long axes of the microprisms (i.e. along Y-Y'). If the device is rotated such that the viewing direction is parallel with the long axes of the microprisms (i.e. along X-X'), the effect is seen to a lesser extent.

A variety of different functional region surface relief structures can be used for a security device according to the present invention, as will be highlighted with reference to the following FIGS. 19 to 25.

Figure 19:
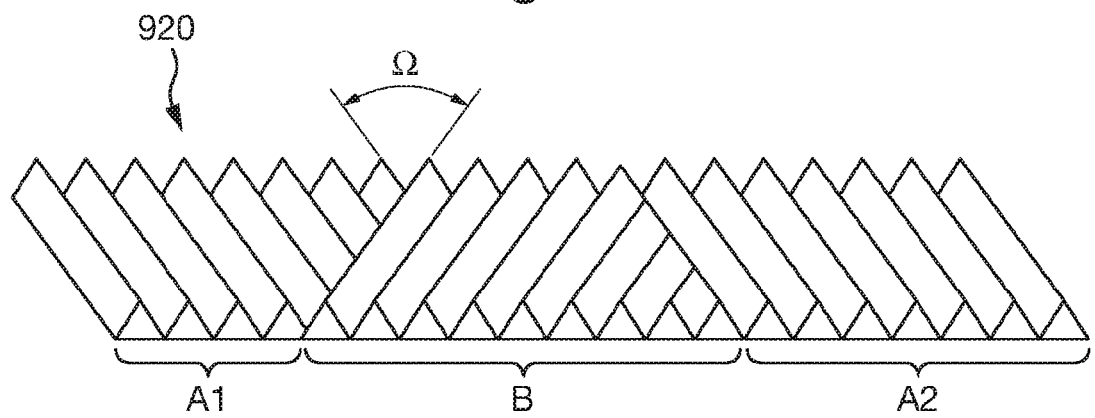

FIG. 19 illustrates an example functional region 920 that comprises three regions A1, B and A2, each comprising a plurality of microprisms. The microprisms in each region are parallel with each other, and the microprisms of regions A1 and A2 are parallel. However, the microprisms of region B are offset from those of regions A1 and A2, such that the long axes of the microprisms of regions A1 and A2 define an angle Ω with the long axes of region B. Thus, the functional region 920 will provide a modifying optical effect when tilted and viewed along a direction perpendicular to the long axes of the microprisms of regions A1 and A2, as well as a readily seen optical effect when functional region 920 is rotated and viewed from a direction perpendicular to the long axes of region B. This is in contrast to the surface relief of FIG. 18, where the long axes of the microprisms are aligned in a single direction.

Figure 20:
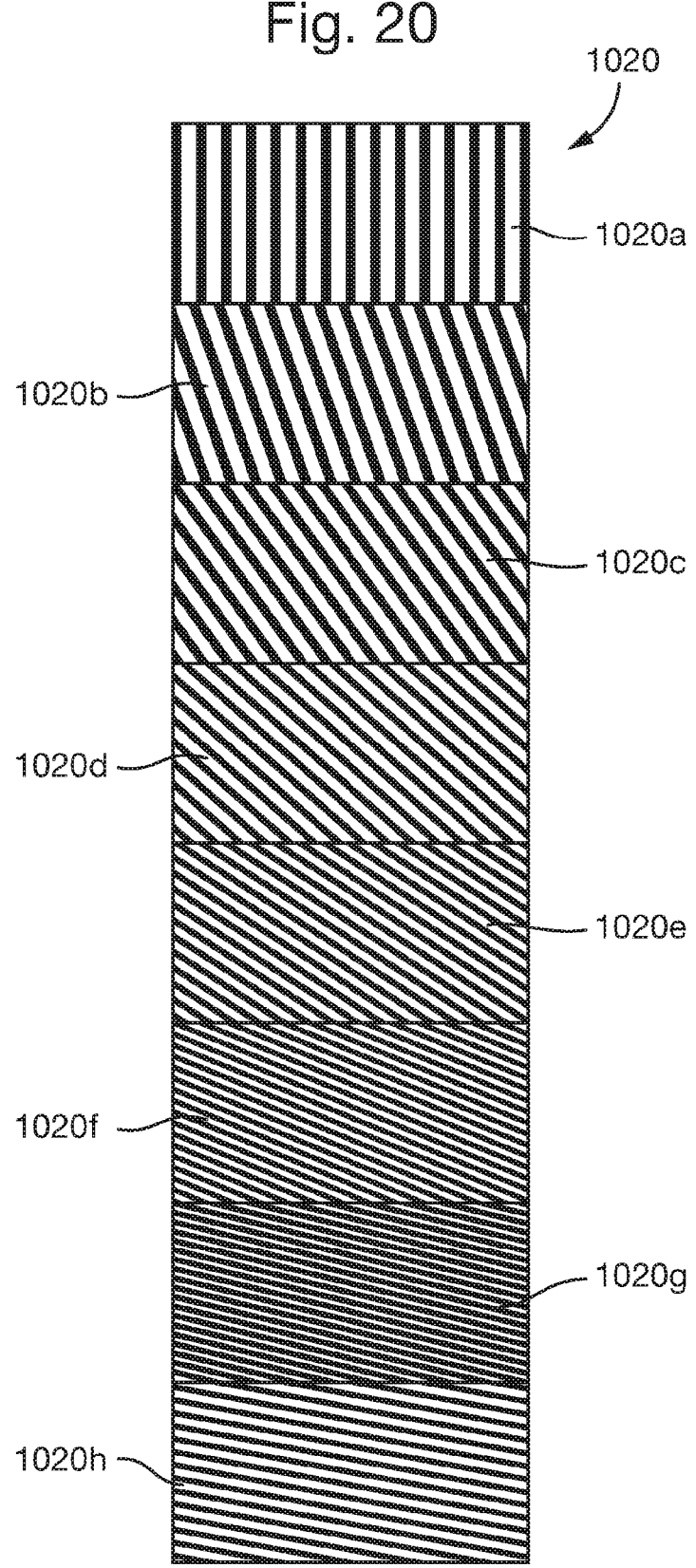

It is envisaged that a functional region may comprise a plurality of regions offset from each other can be used, as shown in FIG. 20. FIG. 20 schematically illustrates a functional region 1020 comprising a plurality of linear microprisms arranged in a plurality of arrays 1020a, 1020b . . . 1020h rotationally offset to each other.

Figure 21:
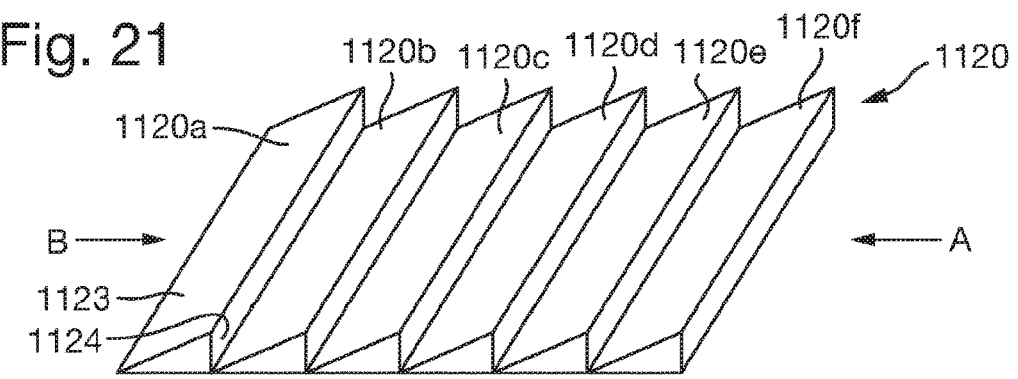

FIG. 21 illustrates a functional region comprising a plurality of microprisms 1020a, 1020b . . . 1020f each having a "saw-tooth" structure, in that one facet (shown here at 1123) defines a more acute angle with the outer surface of the security device than the other facet of the microprism (shown at 1124). Such a saw-tooth structure, when viewed from direction A, will provide a colour shift effect that occurs over a narrow angle of tilt. Conversely, when viewed from direction B, the colour shift occurs over a relatively large angle of tilt.

Figure 22:
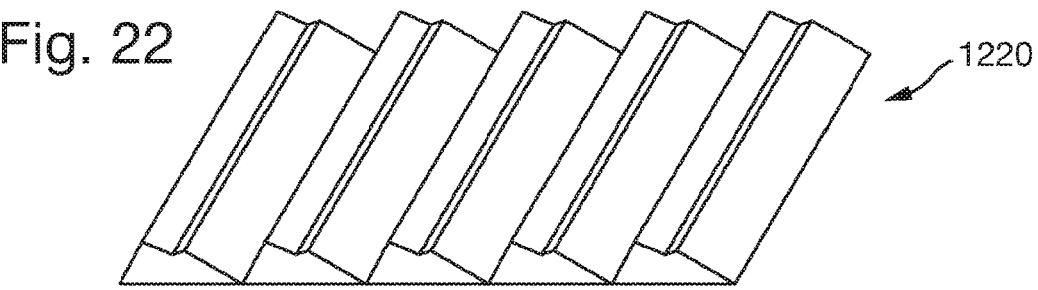
Figure 23:
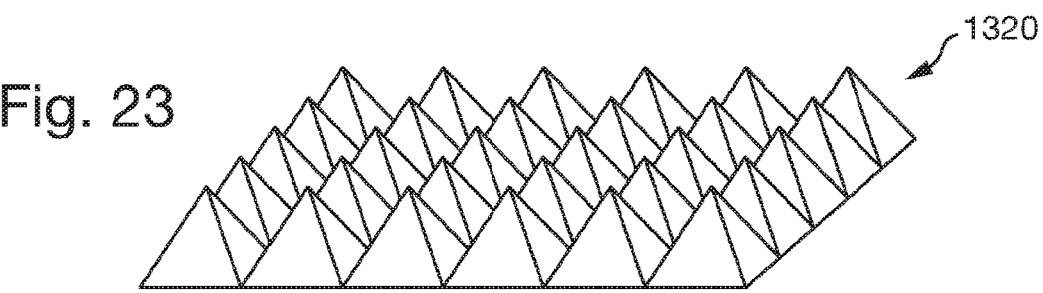
Figure 24:
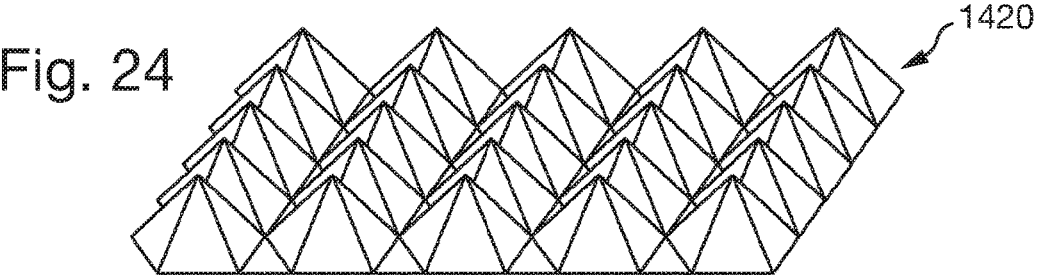

The functional region may comprise a series of multi-faceted microprisms (i.e. having more than two facets), as shown in the surface relief 1120 of FIG. 22.

To obtain more isotropy in the optical properties of the light control layer, a "two-dimensional" microprismatic structure may be used comprising microprisms that are not as rotationally dependent as the linear microprisms of FIG. 18 for example. Such examples include corner cubes, square based pyramid microprisms as depicted in the functional region 1320 of FIG. 23, or more generally polygon-based pyramidal microprisms such as the hexagonal based pyramidal microprisms seen in the functional region 1420 of FIG. 24.

Figure 25:
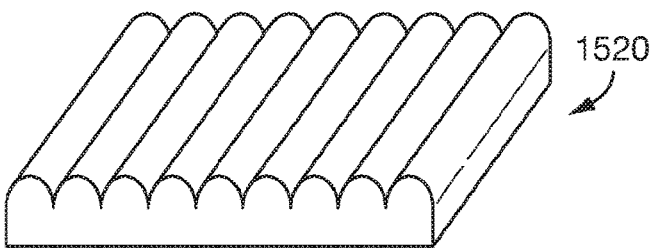

FIG. 25 depicts a functional region 1520 which has a structure similar to a microprismatic structure, but instead of microprisms comprises an array of lecticules with a domed surface structure.

It is envisaged that any of the surface reliefs illustrated in FIGS. 18 to 25 may be provided as a "blank" light control layer, and the surface relief subsequently selectively modified in order to form at least one non-functional region that is not discernible to the naked eye, as has been described above.

Security devices of the sort described above can be incorporated into or applied to any article for which an authenticity check is desirable. In particular, such devices may be applied to or incorporated into documents of value such as banknotes, passports, driving licenses, cheques, identification cards etc.

The security device or article can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. ER-A-0860298 and WO-A-03095188 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

The security device or article may be subsequently incorporated into a paper or polymer base substrate so that it is viewable from both sides of the finished security substrate. Methods of incorporating security elements in such a manner are described in ER-A-1141480 and WO-A-03054297. In the method described in EP-A-1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security device or a separate security device can be applied to the transparent substrate of the document. WO-A-0039391 describes a method of making a transparent region in a paper substrate. Other methods for forming transparent regions in paper substrates are described in EP-A-723501, EP-A-724519, WO-A-03054297 and EP-A-1398174.

The security device may also be applied to one side of a paper substrate so that portions are located in an aperture formed in the paper substrate, An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

Examples of such documents of value and techniques for incorporating a security device will now be described with reference to FIGS. 26 to 29.

Figure 26A:
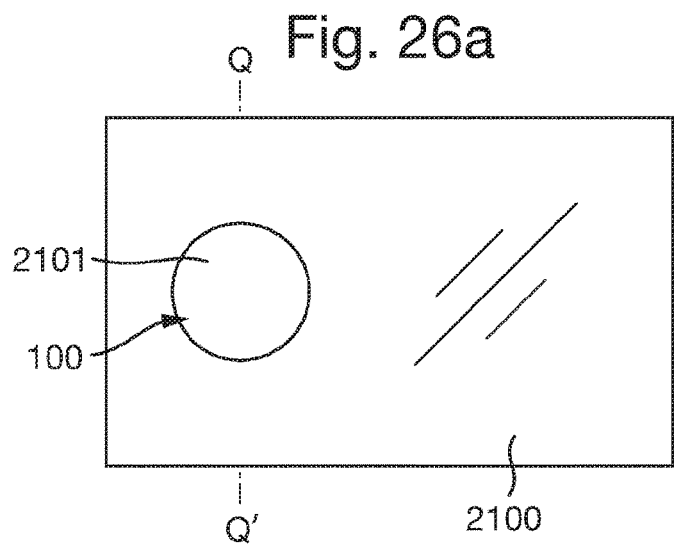
Figure 26B:
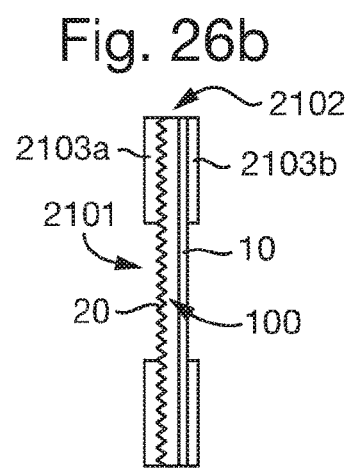

FIG. 26 depicts an exemplary document of value 2100, here in the form of a banknote. FIG. 26a shows the banknote in plan view whilst FIG. 26b shows the same banknote in cross-section along the line Q-Q'. In this case, the banknote is a polymer (or hybrid polymer/paper) banknote, having a transparent substrate 2102. Two opacifying layers 2103a and 2103b are applied to either side of the transparent substrate 2102, which may take the form of opacifying coatings such as white ink, or could be paper layers laminated to the substrate 2102.

The opacifying layers 2103a and 2103b are omitted across an area 2101 which forms a window within which the security device 100 is located. As shown best in the cross-section of FIG. 26b, a colour shifting element 10 is provided on one side of the transparent substrate 2102, and a light control layer 20 is provided on the opposite surface of the substrate such that light from the colour shifting element interacts with the light control layer (however the colour shifting element and the light control layer may alternatively be provided on the same side of the substrate). The colour shifting element 10 and light control layer 20 are each as described above with respect to any of the disclosed embodiments, such that the device 100 displays an optically variable effect in window 2101 upon tilting the device (an image of the letter "A" is depicted here as an example). The device 100 may be viewed in transmission or reflection. In the case where it is to be viewed in reflection it is desirable to use a substantially opaque colour shifting element such as a printed ink comprising an optically variable pigment, although a partially transparent colour shifting element may be used in conjunction with an absorbing element as described above. It should be noted that in modifications of this embodiment the window 2101 could be a half-window with the opacifying layer 2103b continuing across all or part of the window over the colour shifting element 10. The banknote may also comprise a series of windows or half-windows. In this case different areas displayed by the security device could appear in different ones of the windows, at least at some viewing angles, and could move from one window to another upon tilting.

Figure 27A:
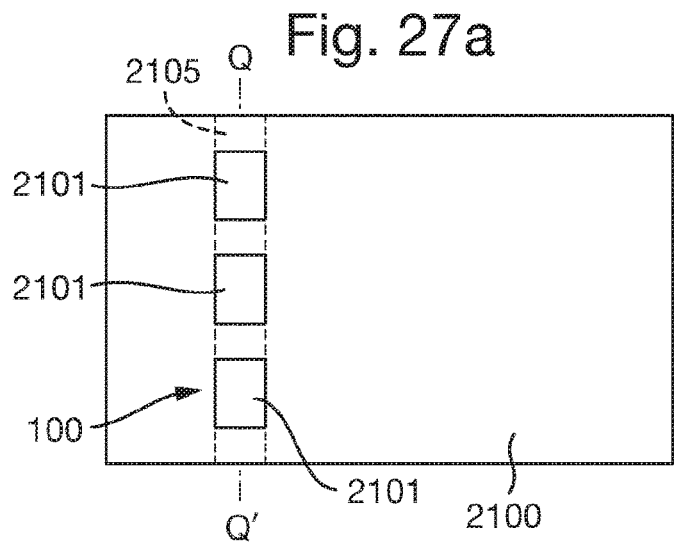
Figure 27B:
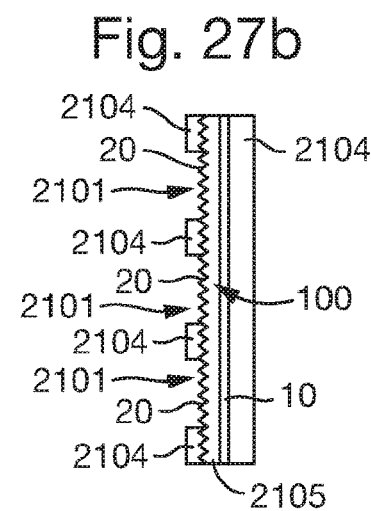

FIG. 27 shows such an example, although here the banknote 2100 is a conventional paper-based banknote provided with a security article 2105 in the form of a security thread, which is inserted during paper-making such that it is partially embedded into the paper so that portions of the paper 2104 lie on either side of the thread. This can be done using the techniques described in EP0059056 where paper is not formed in the window regions during the paper making process thus exposing the security thread in is incorporated between layers of the paper. The security thread 2105 is exposed in window regions 2101 of the banknote. Alternatively the window regions 2101 may for example be formed by abrading the surface of the paper in these regions after insertion of the thread. The security device 100 is formed on the thread 2105, which comprises a transparent substrate with light control layer 20 provided on one side and a colour shifting element 10 provided on the other. In FIG. 27(b), the colour shifting element and light control layer are both provided continuously along opposing of the thread 2105 such that registration of the light control layer and exposed window regions is not required.

If desired, several different security devices 100 could be arranged along the thread, with different optical effects displayed by each. In one example, a first window could contain a first security device, and a second window could contain a second security device, both devices having functional region surface reliefs comprising linear microprisms, with the linear microprisms of each device arranged along different (preferably orthogonal) directions, so that the two windows display different effects upon tilting in any one direction. For instance, the central window may be configured to exhibit a motion effect when the document 100 is tilted about the x axis whilst the devices in the top and bottom windows remain static, and vice versa when the document is tilted about the y axis. The light control layers of the security devices may have different arrangements (e.g. spacings) of functional and non-functional regions such that different windows appear different colours upon tilting.

Figure 28A:
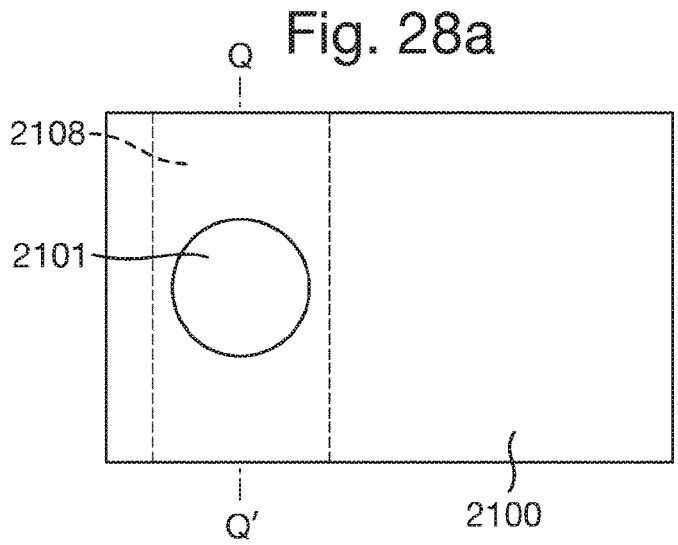
Figure 28B:
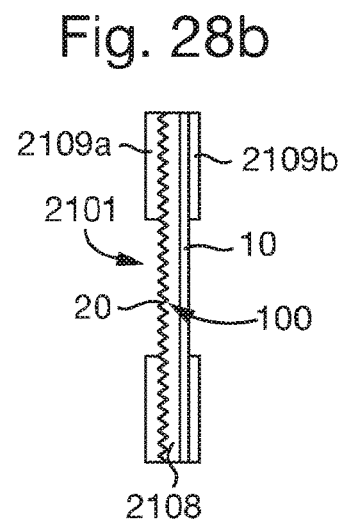

In FIG. 28, the banknote 2100 is again a conventional paper-based banknote, provided with a strip element or insert 2108. The strip 2108 is based on a transparent substrate and is inserted between two plies of paper 2109a and 2109b. The security device 100 is formed by a light control layer 20 on one side of the strip substrate, and a colour shifting element 10 on the other. The paper plies 2109a and 2109b are apertured across region 2101 to reveal the security device 100, which in this case may be present across the whole of the strip 2108 or could be localised within the aperture region 2101. The colour shifting element 10 is visible through the light control layer 20 due to the transparent nature of the strip 2108.

A further embodiment is shown in FIG. 29 where FIGS. 29(a) and (b) show the front and rear sides of the document 2100 respectively, and FIG. 29(c) is a cross section along line Q-Q'. Security article 2110 is a strip or band comprising a security device 100 according to any of the embodiments described above. The security article 2110 is formed into a security document 2100 comprising a fibrous substrate 2102, using a method described in EP-A-1141480. The strip is incorporated into the security document such that it is fully exposed on one side of the document (FIG. 29(a)) and exposed in one or more windows 2101 on the opposite side of the document (FIG. 29(b)). Again, the security device is formed on the strip 2110, which comprises a transparent substrate with a light control layer 20 formed on one surface and colour shifting element 10 formed on the other.

In FIG. 29, the document of value 2100 is again a conventional paper-based banknote and again includes a strip element 2110, In this case there is a single ply of paper. Alternatively a similar construction can be achieved by providing paper 2102 with an aperture 2101 and adhering the strip element 2110 on to one side of the paper 2102 across the aperture 2101. The aperture may be formed during papermaking or after papermaking for example by die-cutting or laser cutting. Again, the security device is formed on the strip 2110, which comprises a transparent substrate with a light control layer 20 formed on one surface and a colour shifting element 10 formed on the other.

In the examples of FIGS. 26 to 29, the colour shifting element and light control layer are described as being on opposing side of a transparent substrate. However in other examples they may be provided on the same side of the transparent substrate. Advantageously, the light control layer and colour shifting element 10 are provided continuously in the examples of FIGS. 26 to 29 such that registration with the windowed regions is not required.

The invention claimed is:

1. A method of forming a security device including a color shifting element, wherein the color shifting element provides a first optical effect, the method comprising:
providing a light control layer over at least a part of the color shifting element, the light control layer including a functional region and at least one non-functional region, the functional region including a surface relief configured to modify an angle of light from the color shifting element so as to generate a second optical effect different from the first optical effect, the at least one non-functional region being configured to maintain the angle of light from the color shifting element, the at least one non-functional region being indiscernible to a naked eye, wherein the light control layer includes a first area and a second area, the first area including a first arrangement of functional regions and the second area including a second arrangement of functional regions such that the first area and the second area are configured to provide different optical effects to a viewer, and either:

(i) a majority of the first area includes a plurality of functional regions including the functional region of the light control layer, and the second area includes the plurality of functional regions spaced apart by a plurality of non-functional regions including the at least one non-functional region of the light control layer, or (ii) the first area includes the plurality of functional regions spaced apart by the plurality of non-functional regions in the first arrangement, and the second area includes the plurality of functional regions spaced apart by the plurality of non-functional regions in the second arrangement different from the first arrangement.

2. The method of claim 1, wherein providing the light control layer includes:

providing the surface relief over at least a part of the color shifting element, and selectively modifying a part of the surface relief so as to provide the non-functional region at the modified part of the surface relief.

3. The method of claim 2, wherein selectively modifying the part of the surface relief includes one of: (i) introducing a material to at least one depression of the surface relief so as to form a planar region of the light control layer, (ii) removing at least a part of the surface relief, or (iii) deforming at least a part of the surface relief so as to form a planar region of the light control layer, the planar region defining the non-functional region.

4. A security device comprising:

a color shifting element configured to provide a first optical effect; and a light control layer covering at least a part of the color shifting element, the light control layer including a functional region and at least one non-functional region, the functional region including a surface relief configured to modify an angle of light from the color shifting element so as to generate a second optical effect different from the first optical effect, the non-functional region being configured to maintain the angle of light from the color shifting element, the at least one non-functional region being indiscernible to a naked eye, the light control layer including a first area and a second area, the first area including a first arrangement of functional regions and the second area including a second arrangement of functional regions such that the first area and the second area are configured provide different optical effects to a viewer, wherein either:

(i) a majority of the first area includes a plurality of functional regions including the functional region, and the second area includes the plurality of functional regions spaced apart by a plurality of non-functional regions including the at least one non-functional region, or (ii) the first area includes the plurality of functional regions spaced apart by the plurality of non-functional regions in the first arrangement, and the second area includes the plurality of functional regions spaced apart by the plurality of non-functional regions in the second arrangement different from the first arrangement.

5. The security device of claim 4, wherein the at least one non-functional region has a dimension less than 150µm.

6. The security device of claim 4, wherein the at least one non-functional region has a dimension less than 70 µm.

7. The security device of claim 4, wherein in at least one part of the security device, the first and second optical effects combine to form a third optical effect.

8. The security device of claim 7, wherein, in at least one viewing angle, the first optical effect exhibits a first color and the second optical effect exhibits a second color different from the first color, and the third optical effect exhibits a resultant color resulting from the first color and the second color.

9. The security device of claim 4, wherein the at least one non-functional region includes a region without a material that forms the light control layer.

10. The security device of claim 4, wherein the at least one non-functional region includes a planar region.

11. The security device of claim 4, wherein non-functional regions in the first area have first dimensions and non-functional regions in the second area have second dimensions, wherein the first and second dimensions are different.

12. The security device of claim 4, wherein the surface relief includes at least one microstructure.

13. The security device of claim 12, wherein the at least one microstructure is a linear microprism and the surface relief includes an array of linear microprisms.

14. The security device of claim 13, wherein the surface relief includes a plurality of arrays of linear microprisms, each linear microprism of the plurality of arrays of linear microprisms having a respective longitudinal axis, longitudinal axes of the linear microprisms of a first array of linear microprisms of the plurality of arrays of microprisms being angularly offset from longitudinal axes of the linear microprisms of a second array of linear microprisms of the plurality of arrays of microprisms.

15. The security device of claim 12, wherein the at least one microstructure is either a one dimensional microstructure or a two dimensional microstructure.

16. The security device of claim 4, wherein the at least one non-functional region defines indicia.

17. The security device of claim 4, further comprising an absorbing element positioned on a distal side of the color shifting element with respect to the light control layer, the absorbing element being configured to at least partially absorb light transmitted through the color shifting element.

18. The security device of claim 4, wherein the color shifting element includes one of: a photonic crystal structure, a liquid crystal material, an interference pigment, a pearlescent pigment, a structured interference material, or a thin film interference structure such as a Bragg stack.

19. A secure substrate comprising a base substrate and the security device according to claim 4.

* * * * *